US012099136B2

(12) United States Patent
Li et al.

(10) Patent No.: US 12,099,136 B2
(45) Date of Patent: Sep. 24, 2024

(54) MICROWAVE RADAR AND UNMANNED AERIAL VEHICLE

(71) Applicant: SZ DJI TECHNOLOGY CO., LTD., Shenzhen (CN)

(72) Inventors: Xun Li, Shenzhen (CN); Chunming Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 601 days.

(21) Appl. No.: 17/326,301

(22) Filed: May 20, 2021

(65) Prior Publication Data
US 2021/0278496 A1  Sep. 9, 2021

Related U.S. Application Data

(63) Continuation of application No. PCT/CN2018/116601, filed on Nov. 21, 2018.

(51) Int. Cl.
*G01S 7/02* (2006.01)
*G01S 7/35* (2006.01)
(Continued)

(52) U.S. Cl.
CPC ............ *G01S 7/0235* (2021.05); *G01S 7/354* (2013.01); *G01S 13/933* (2020.01); *G05D 1/106* (2019.05)

(58) Field of Classification Search
CPC . G01S 7/023; G01S 7/23; G01S 7/354; G01S 7/537; G01S 13/343; G01S 13/345;
(Continued)

(56) References Cited

U.S. PATENT DOCUMENTS 4,555,703 A * 11/1985 Cantrell ................ G01S 13/534
342/13
6,646,589 B2 * 11/2003 Natsume ................ G01S 7/354
342/107
(Continued)

FOREIGN PATENT DOCUMENTS

CN           1741514 A     3/2006
CN         102707265 A    10/2012
(Continued)

OTHER PUBLICATIONS

Zhuoming Dong et al., "Control method of Manned/Unmanned Aerial Vehicle cooperative formation based on mission effectiveness", 2016 IEEE Chinese Guidance, Navigation and Control Conferenc, Aug. 12, 2016, pp. 881-888.
(Continued)

*Primary Examiner* — Vladimir Magloire
*Assistant Examiner* — Michael W Justice
(74) *Attorney, Agent, or Firm* — ANOVA LAW GROUP, PLLC

(57) ABSTRACT

The present disclosure provides a UAV control method. The method includes controlling an antenna device of a microwave radar of the UAV to transmit a microwave transmission signal and obtain a received signal, the microwave transmission signal and the received signal both being trapezoidal modulation waveforms, and one cycle of the trapezoidal modulation waveform including a frequency rising part, a frequency falling part, and a fixed frequency part; obtaining an intermediate frequency signal mixed by a frequency of the microwave transmission signal and the received signal to the radar controller, and determining whether the received signal is an interference signal based on the intermediate frequency signal; determining coordinate information of a detection target corresponding to the received signal if the received signal is not the interference
(Continued)

signal; and updating a trajectory of the UAV based on the coordinate information of the detection target.

9 Claims, 10 Drawing Sheets

(51) Int. Cl.
*G01S 13/933* (2020.01)
*G05D 1/00* (2024.01)

(58) Field of Classification Search
CPC ...... G01S 13/347; G01S 13/348; G01S 13/38; G01S 13/038
USPC .......................................... 342/128, 192, 63
See application file for complete search history.

(56) References Cited

U.S. PATENT DOCUMENTS

| | | | | |
|---|---|---|---|---|
| 7,379,016 | B1* | 5/2008 | McEwan | G01S 7/484 342/134 |
| 7,522,513 | B2* | 4/2009 | Henriksson | H04L 1/20 370/208 |
| 7,864,098 | B2* | 1/2011 | Kajio | G01S 13/24 342/59 |
| 8,031,106 | B2* | 10/2011 | Szajnowski | G01S 13/584 342/115 |
| 8,574,162 | B2* | 11/2013 | Watson | A61B 5/7278 600/502 |
| 8,897,654 | B1* | 11/2014 | Pierrottet | H04B 10/5563 398/183 |
| 9,712,250 | B2* | 7/2017 | Pierrottet | H04B 10/2575 |
| 10,539,669 | B2* | 1/2020 | Ikram | G01S 13/42 |
| 10,746,848 | B2* | 8/2020 | Katayama | G01S 13/93 |
| 10,775,221 | B2* | 9/2020 | Blomberg | G01S 7/354 |
| 10,838,040 | B2* | 11/2020 | Jales | G01S 13/28 |
| 10,864,913 | B2* | 12/2020 | Ide | G08G 1/167 |
| 10,935,589 | B2* | 3/2021 | Ben Hassen | G01R 31/11 |
| 11,035,946 | B2* | 6/2021 | Pefkianakis | H04W 64/006 |
| 2005/0220001 | A1* | 10/2005 | Henriksson | H04L 1/20 370/208 |
| 2006/0116095 | A1* | 6/2006 | Henriksson | H04L 27/2691 455/223 |
| 2006/0181448 | A1 | 8/2006 | Natsume et al. | |
| 2007/0229349 | A1* | 10/2007 | Kajio | G01S 13/24 342/36 |
| 2008/0231497 | A1* | 9/2008 | Sakamoto | G01S 13/345 342/159 |
| 2008/0284638 | A1* | 11/2008 | Kajio | G01S 13/87 342/59 |
| 2010/0141504 | A1* | 6/2010 | Szajnowski | G01S 13/584 342/114 |
| 2013/0038485 | A1* | 2/2013 | Nakamura | G01S 7/4865 342/195 |
| 2014/0334830 | A1* | 11/2014 | Pierrottet | H04B 10/2575 398/187 |
| 2015/0104193 | A1* | 4/2015 | Pierrottet | H04B 10/2575 398/187 |
| 2016/0103213 | A1* | 4/2016 | Ikram | G01S 13/42 342/105 |
| 2017/0153315 | A1* | 6/2017 | Katayama | G01S 13/38 |
| 2018/0259618 | A1* | 9/2018 | Jales | G01S 15/104 |
| 2019/0092331 | A1* | 3/2019 | Ide | B60W 10/20 |
| 2019/0101430 | A1* | 4/2019 | Blomberg | G01S 7/006 |
| 2019/0107573 | A1* | 4/2019 | Ben Hassen | G01R 31/088 |
| 2020/0088869 | A1* | 3/2020 | Pefkianakis | H04W 64/006 |

FOREIGN PATENT DOCUMENTS

| | | | | |
|---|---|---|---|---|
| CN | 102707266 A | * | 10/2012 | ............... G01S 7/36 |
| CN | 103376448 A | | 10/2013 | |
| CN | 102707266 B | | 6/2014 | |
| CN | 105846841 A | | 8/2016 | |
| CN | 108521792 A | | 9/2018 | |
| CN | 108535703 A | | 9/2018 | |
| CN | 108717179 A | | 10/2018 | |
| JP | 2006220624 A | * | 8/2006 | ........... G01S 13/345 |
| JP | 2008292264 A | | 12/2008 | |
| KR | 101348548 B1 | | 1/2014 | |

OTHER PUBLICATIONS

Sarunic Peter et al., "Hierarchical model predictive control of UAVs performing multitarget-multisensor tracking", IEEE Transactions on Aerospace and Electronic System, vol. 50, No. 3, Jul. 1, 2014, pp. 2253-2268.

The World Intellectual Property Organization (WIPO) International Search Report for PCT/CN2018/116601 Aug. 21, 2019 pages.

Liang Han et al., "Multifunctional Transceiver for Future Intelligent Transportation Systems", IEEE Transactions on Microwave Theory and Techniques, Jul. 31, 2011, pp. 1879-1892, vol. 59.

Fan Yang, "Algorithm Research and System Realization of LFMCW Radar Signal Processing", 2007.

Yanqiu Zhao et al., "Anti-jamming Design of LFMCW Radar", Shipboard Electronic Countermeasure, vol. 39 No. 1, pp. 54-57, Feb. 2016.

Mark A. Richards et al, "Fundamentals of Radar Signal Processing", Simplified Chinese translation edition published by McGraw-Hill Education (Asia) Co. and Publishing House of Electronics Industry. 2008.

* cited by examiner

US 12,099,136 B2

MICROWAVE RADAR AND UNMANNED AERIAL VEHICLE

CROSS-REFERENCE TO RELATED APPLICATION

This application is a continuation of International Application No. PCT/CN2018/116601, filed on Nov. 21, 2018, the entire content of which is incorporated herein by reference.

TECHNICAL FIELD

The present disclosure relates to the field of aircraft and, more specifically, to a microwave radar and an unmanned aerial vehicle (UVA).

BACKGROUND

An anti-interference method between linear frequency-modulated triangular-wave radars is to strictly control the transmission time between multiple microwave radars, such that the interference generated by other microwave radars on a microwave radar is outside the filter bandwidth of the microwave radar receiver. Therefore, the interference can be filtered out by the filter to implement the anti-interference function.

SUMMARY

One aspect of the present disclosure provides a UAV control method. The method includes controlling an antenna device of a microwave radar of the UAV to transmit a microwave transmission signal and obtain a received signal, the microwave transmission signal and the received signal both being trapezoidal modulation waveforms, and one cycle of the trapezoidal modulation waveform including a frequency rising part, a frequency falling part, and a fixed frequency part; obtaining an intermediate frequency signal mixed by a frequency of the microwave transmission signal and the received signal to the radar controller, and determining whether the received signal is an interference signal based on the intermediate frequency signal; determining coordinate information of a detection target corresponding to the received signal if the received signal is not the interference signal; and updating a trajectory of the UAV based on the coordinate information of the detection target.

BRIEF DESCRIPTION OF THE DRAWINGS

The above and/or additional aspects and advantages of the present disclosure will become obvious and easy to understand from the description of embodiments in conjunction with the following drawings.

DETAILED DESCRIPTION OF THE EMBODIMENTS

In order to illustrate the technical solutions in accordance with the embodiments of the present disclosure more clearly, the present disclosure will be further described in detail below in conjunction with the accompanying drawings and specific embodiment. It should be noted that when there is no conflict, the embodiments and the features in the embodiments of the present disclosure can be combined with each other.

In the following description, many specific details are described in order to fully understand the present disclosure. However, the present disclosure may also be implemented in other ways different from those described herein. Therefore, the protection scope of the present disclosure is not limited to the specific embodiments disclosed hereinafter.

Figure 1:
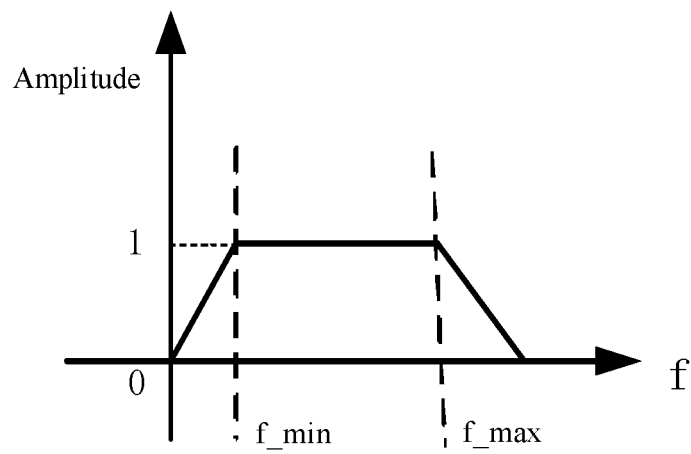
FIG. 1 is a schematic diagram of a frequency characteristic of a filter in a microwave radar receiver in the related art.

FIG. 1 is a schematic diagram of a frequency characteristic of a filter in a microwave radar receiver in the related art. As shown in FIG. 1, the frequency range of the receiving intermediate frequency signal of the microwave radar is between f_min to f_max, where f_max represents the maximum receiving frequency, and f_min represents the minimum receiving frequency. In order to measure a close-range target, generally the value of f_min can be relatively small, such as close to zero. For the receiver, when the received signal frequency of the intermediate frequency is greater than f_max, it will be filtered out by the receiver.

Figure 2:
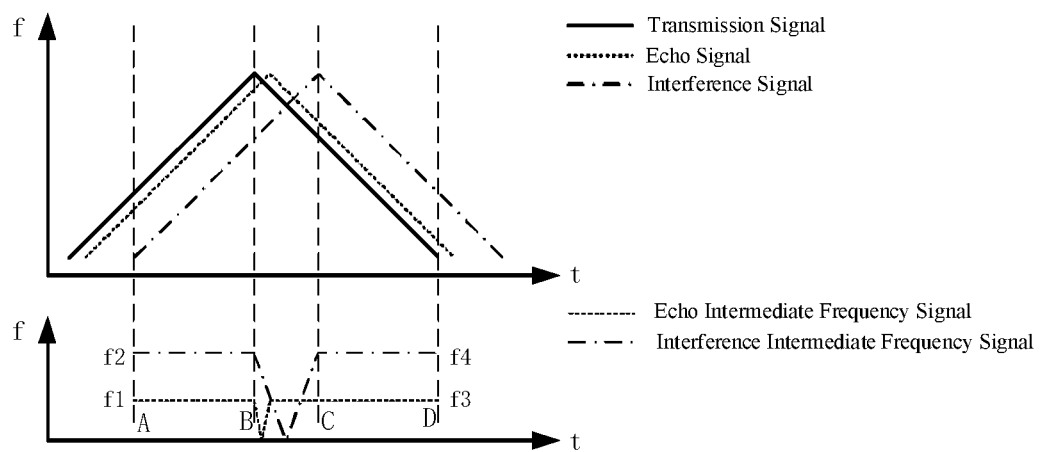
FIG. 2 is a schematic diagram of a principle of microwave radar anti-interference in related technologies.

FIG. 2 is a schematic diagram of a principle of microwave radar anti-interference in related technologies. The upper portion of FIG. 2 illustrate a schematic diagram of the frequency of the signal transmitted and received by the microwave radar over time. The solid triangular waveform represents the change of the frequency of the transmitted signal of the microwave radar over time, the dashed triangular wave represents the change of the frequency of the normal echo signal received by the microwave radar over time, and the dotted horizontal triangular waveform represent the frequency of the interference signal received by the microwave radar over time. The lower portion of FIG. 2 illustrates the frequency change over time of the intermediate frequency signal obtained after the above signal is mixed by the microwave radar receiver. The dotted line represents the intermediate frequency signal of the normal echo signal, the dotted horizontal line represents the intermediate frequency signal of the interference signal, a segment AB represents the change of signal frequency over time in the rising edge of the triangular wave, and a segment CD represents the change of signal frequency over time in the falling edge of the triangular wave. As shown in FIG. 2, the echo signal respectively generates intermediate frequency signals f1 and f3 of constant frequency on the rising and falling edges of the triangular waveform, and f1=f3. The interference signal respectively generates intermediate frequency signals f2 and f4 of constant frequency on the rising and falling edges of the triangular waveform, and f2=f4. In order to use the filter of the microwave radar receiver to filter out the intermediate frequency interference of f2 and f4, the condition of f2=f4>f_max needs to be satisfied. As shown in FIG. 2, the greater the delay between the triangular wave of the interference signal and the triangular wave of the transmitted signal, the greater the value of f2 and f4. Therefore, by artificially controlling the fixed frequency delay of the triangular waveform of the transmitted signal between multiple microwave radars, the triangular waveform of the interference signal transmitted by other microwave radars received by the microwave radar can have a relatively longer delay than the triangular waveform of the self-transmitted signal, such that the condition of f2=f4>f_max, and the filter in the microwave radar receiver can be used to filter out the interference of other microwave radars to the microwave radar.

Figure 3:
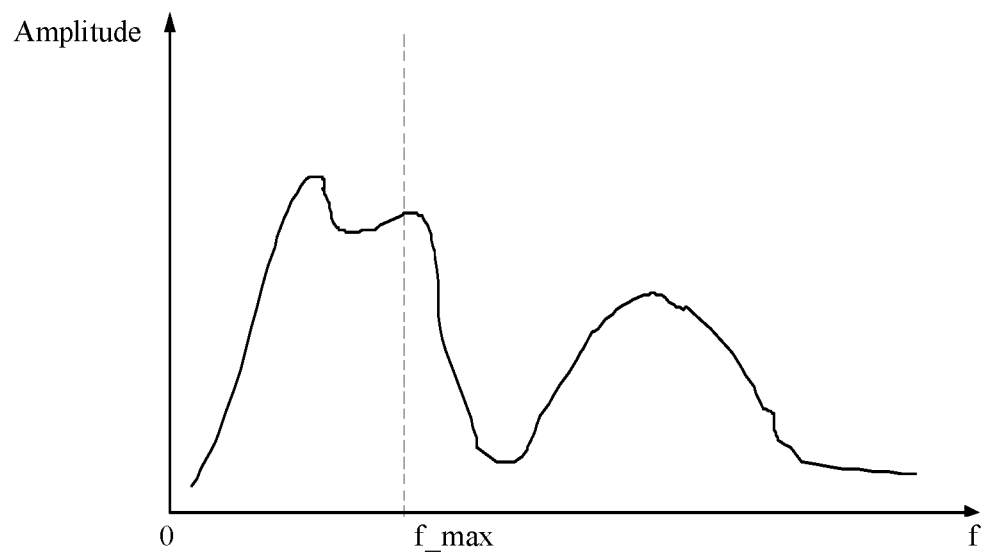
FIG. 3 is a frequency spectrum of a segment BC of an intermediate frequency signal shown in FIG. 2.

The microwave radar anti-interference method in the related technologies needs to strictly control the signal transmission time of each microwave radar, therefore, it needs to synchronize the time of multiple microwave radars, which is difficult to implement. Further, the conventional microwave radar anti-interference method cannot solve the interference problem between multiple microwave radars that cannot be time synchronized. In addition, the anti-interference method in the related technology can only solve the interference problem of the segments AB and CD in FIG. 2, and cannot solve the interference problem in segment BC, since the interference signal in segment BC generally includes a signal with a frequency lower than f_max, as shown in FIG. 3. That is, a part of the interference signal of a segment BC is mixed in the useful signal bandwidth of the microwave radar receiver filter and cannot be filtered out by the receiver filter.

Figure 4:
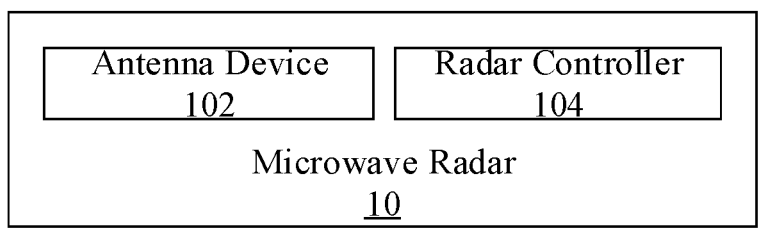
FIG. 4 is a schematic block diagram of a microwave radar according to an embodiment of the present disclosure.

An embodiment of the first aspect of the present disclosure provides a microwave radar. FIG. 4 is a schematic block diagram of a microwave radar 10 according to an embodiment of the present disclosure. The microwave radar 10 includes an antenna device 102 and a radar controller 104, and the radar controller 104 is in communication connection with the antenna device 102. The microwave radar 10 can implement the anti-interference method of time synchronization between multiple microwave radars by mainly including the anti-co-interference and the anti-time-domain burst interference method. The antenna device 102 may be configured to transmit microwave signals and/or obtain received signals. Both the microwave transmitting signal and the receiving signal can be trapezoidal modulation waveforms. One cycle of the trapezoidal modulation waveforms may include a frequency rising part (rising edge), a frequency falling part (falling edge), and a fixed frequency part. In addition, the antenna device 102 may be configured to send a mixed intermediate frequency signal of the frequency of the microwave transmission signal and the receiving signal to the radar controller 104. The radar controller 104 may be configured to determine whether the received signal is an interference signal based on the intermediate frequency signal.

In some embodiments, the microwave radar 10 may be disposed on a UAV. The radar controller 104 may include one or more microprocessors. The microwave radar 10 may further include a signal transmitter, a signal receiver, a filter, a mixer, and the like.

In some embodiments, the radar controller 104 determining whether the received signal is an interference signal based on the intermediate frequency signal may include determining a first constant frequency of the intermediate frequency signal corresponding to the frequency rising part of the received signal and a second constant frequency of the intermediate frequency signal corresponding to the frequency falling part of the received signal based on the intermediate frequency signal; and, determining whether the received is an interference signal based on the first constant frequency and the second constant frequency.

In some embodiments, the radar controller 104 determining whether the received is an interference signal based on the first constant frequency and the second constant frequency may include calculating a frequency difference between the first constant frequency and the second constant frequency and determining whether the received signal is an interference signal based on a magnitude relationship between the frequency difference and a predetermined threshold.

In some embodiments, the radar controller 104 determining whether the received signal is an interference signal based on the magnitude relationship between the frequency difference and the predetermined threshold may include determining that the received signal is an interference signal when the frequency difference is greater than or equal to the predetermined threshold; and, determining that the received signal is an echo signal of the microwave transmission signal when the frequency difference is less than the predetermined threshold.

In some embodiments, the radar controller 104 may be further configured to set the delay of the fixed frequency range of the microwave transmission signal and the delay of the fixed frequency range of the microwave transmission signal of other microwave radars to be greater than a predetermined value. For example, a delay t1 of the fixed frequency range of the microwave transmission signal and a delay t2 of the fixed frequency range of the microwave transmission signal of other microwave radars may be set to satisfy a predetermined relationship of $|t1-t2| \geq 2 \times F_{max}/CSR$, where $F_{max}$ is the maximum effective bandwidth of the microwave radar filter, and CSR is the slope of the frequency rising part or the frequency falling part.

Figure 5:
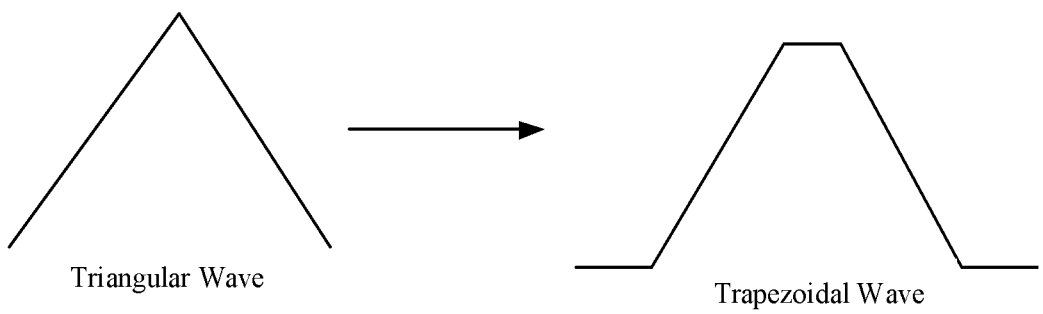
FIG. 5 is a schematic diagram of a modulation frequency change according to an embodiment of the present disclosure.

The microwave radar 10 provided in the present disclosure includes an antenna device 102 and a radar controller 104. The radar controller 104 can control the antenna device 102 to transmit the microwave transmission signal of the trapezoidal modulation waveform and receive the received signal of the trapezoidal modulation waveform, and the trapezoidal modulation waveform may be different from the triangular waveform in the related technology. That is, as shown in FIG. 5, the trapezoidal modulation waveform can be generated by adding a fixed frequency delay for a certain period of time at the transition between the rising and falling edges of the triangular wave. The radar controller 104 can obtain an intermediate frequency signal that may be a mixture of the frequency microwave transmission signal and the received signal, compare the frequency difference between the first constant frequency of the intermediate frequency signal corresponding to the frequency rising part of the received signal and the second constant frequency of the intermediate frequency signal corresponding to the frequency falling part of the received with the predetermined threshold, and determine whether the received signal is an interference signal that is, the received signal is another microwave radar, of the microwave transmission signal based on the comparison result.

In some embodiments, the radar controller 104 may be further configured to eliminate the interference signal after determining that the received signal is an interference signal.

Figure 6:
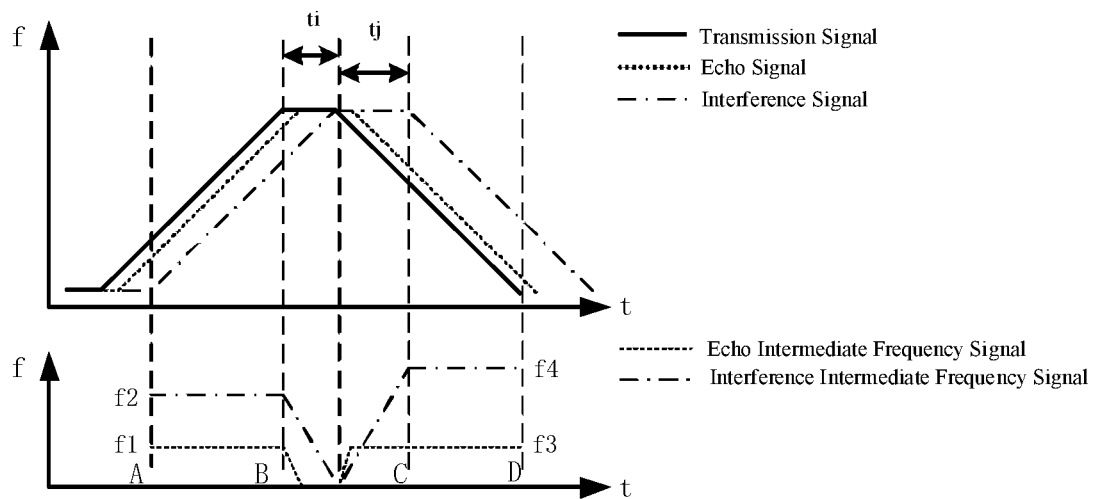
FIG. 6 is a schematic diagram of a principle of a trapezoidal modulation waveform for microwave radar anti-co-interference according to an embodiment of the present disclosure.

The principle of the method of using trapezoidal modulation waveform to resist the same frequency interference of microwave radar is shown in FIG. 6. The upper portion of the FIG. 6 includes a transmitted signal (microwave transmission signal), an echo signal (the reflected signal of the transmitted signal), and an interference signal of the trapezoidal modulation waveform represented by the solid line, the dashed line, and the dotted horizontal line, respectively. Different microwave radars may have different delays in fixed frequency bands in the trapezoidal modulation waveforms. In the upper portion of FIG. 6, it is assumed that the delay of the fixed frequency part in the transmitted signal of the target microwave radar is ti, and the delay of the fixed frequency part in the interference signal of the received interference radar is tj. Since the echo signal is the signal received by the reflection of the transmitted signal, the fixed frequency range delay in the echo signal may be the same as the fixed frequency range delay of the transmitted signal, which is ti. The lower portion of FIG. 6 illustrates the echo intermediate frequency signal and the interference intermediate frequency signal obtained after mixing the radar receiver, where the dashed line represents the echo intermediate frequency signal, the dotted horizontal line represents the interference intermediate frequency signal, f1 and f3 respectively represent the intermediate frequency signal frequency corresponding to the rising edge and falling edge of the trapezoidal modulation waveform of the echo signal, and f2 and f4 respectively represent the intermediate frequency signal frequency corresponding to the rising edge and falling edge of the trapezoidal modulation waveform of the interference signal.

The microwave radar anti-co-frequency interference method provided by the present disclosure is as follow.

(1) Set different fixed frequency delays in the trapezoidal modulation waveforms of multiple microwave radars.

(2) Extract the frequency point of the intermediate frequency signal corresponding to the target signal after processing the intermediate frequency signal of the microwave radar, the rising edge part including f1 and f3, and the falling edge part including f2 and f4.

(3) Since transmission signal of the microwave radar itself may have the same fixed frequency delay as the echo signal, therefore, f1=f3, and the fixed frequency delay of the interference microwave radar signal may be different from that of the microwave radar signal itself, therefore, f2≠f4. Therefore, f1 and f3 may be determined as the effective targets (that is, the signals corresponding to f1 and f3 are echo signals), and when the frequency difference between f4 and f2 is greater than or equal to the predetermined threshold, the signals corresponding to f2 and f4 may be determined as the interference signals.

(4) The fixed frequency delay value of the transmitted signal of different microwave radars may adopt the following setting rules:

$$|t1 - t2| \geq \frac{2 \times F_{max}}{CSR} \quad (1)$$

where t1 represents the fixed frequency range delay of the transmitted signal of the microwave radar itself, t2 represents the fixed frequency range delay of the transmitted signal of other microwave radars, $F_{max}$ represents the maximum effective bandwidth of the filter of the microwave radar itself, and CSR represents the slope of the frequency rising part or the frequency falling part.

Figure 7:
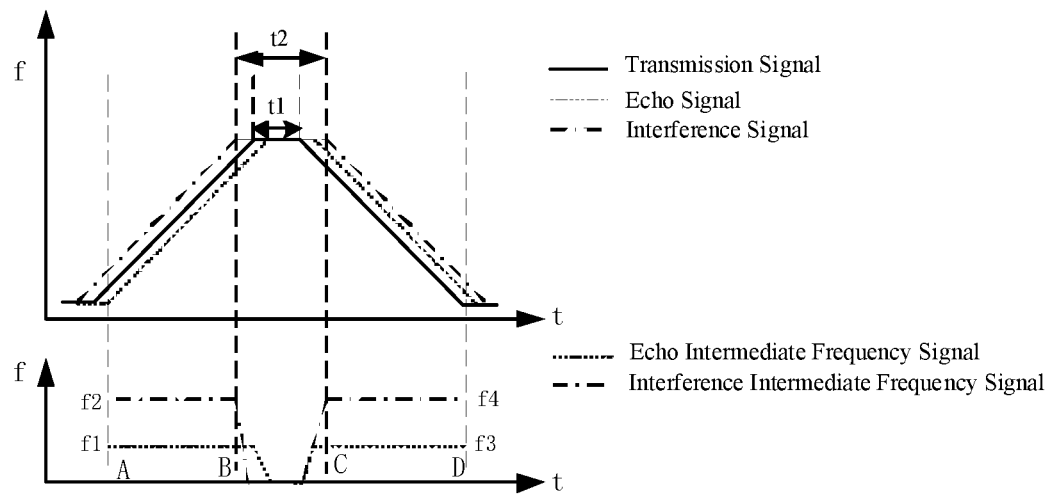
FIG. 7 is a schematic diagram of the principle of the trapezoidal modulation waveform for microwave radar anti-co-interference according to an embodiment of the present disclosure.

The reason why it is needed to set the fixed frequency range delay between two microwave radars to be greater than a fixed value is to filter out the radar interference in a special situation as show in FIG. 7. In FIG. 7, the fixed frequency range delay of the transmission signal of the microwave radar itself is t1, the fixed frequency range delay of the interference signal is t2, and t2=2×t1. At this time f2=f4, and the interference signal cannot be filtered out by comparing the frequency points of the rising edge and the falling edge. However, when t1 and t2 satisfy Formula (1), f2=f4>$F_{max}$, therefore, the interference signal may be filtered out by the intermediate frequency filter of the radar receiver.

In some embodiments, the radar controller 104 may be further configured to determine the signal frequency of the intermediate frequency signal and the change information of the signal amplitude based on the intermediate frequency signal, and determine whether the received signal is an interference signal based on the change information of the signal frequency and the signal amplitude of the intermediate frequency signal.

In some embodiments, the radar controller 104 determining whether the received signal is an interference signal based on the change information of the signal frequency and the signal amplitude of the intermediate frequency signal may include determining the received signal is an interference signal if the change state of the signal frequency of the received signal is gradually decreasing and then gradually increasing, and the change state of the signal amplitude is gradually increasing and then gradually decreasing.

In some embodiments, the radar controller 104 determining whether the received signal is an interference signal based on the change information of the signal frequency and the signal amplitude of the intermediate frequency signal may include obtaining the signal amplitude information of N sampling points of the intermediate frequency signal; selecting P extreme value points based on the signal amplitude information of N sampling points, where P is a positive integer greater than or equal to two and less than N; and determining whether the received signal is an interference signal based on the index values of the P extreme points.

In some embodiments, the radar controller 104 selecting P extreme value points based on the signal amplitude information of N sampling points may include, based on the amplitude information of N sampling points of the intermediate frequency signal, determining a maximum amplitude point and a minimum amplitude point in the N sampling points, calculating the amplitude difference between the maximum amplitude point and the minimum amplitude point, and recording the amplitude difference as a first difference; obtaining P extreme value points whose amplitude difference with the adjacent extreme value point is greater than A/2 from the N sampling points; and recording the index value of each extreme point in P extreme value points, and obtaining the P index values, where P is a positive integer greater than or equal to two and less than N.

In some embodiments, the radar controller 104 determining whether the received signal is an interference signal based on the index values of the P extreme points may include determining whether there are at least two target index values satisfying a predetermined time domain characteristic conditions in the P index values; and determining that the received signal is a burst interference signal in a time period corresponding to a fluctuation frequency after determining there are at least two target index values satisfying the predetermined time domain characteristic conditions in the P index values.

In some embodiments, the radar controller 104 obtaining P extreme value points whose amplitude difference with the adjacent extreme value point is greater than A/2 from the N sampling points may include obtaining all extreme points in the N sampling points, calculating the amplitude difference between every two adjacent extreme points, and recording the amplitude of the extreme point whose amplitude difference is greater than a predetermined difference and the index value of the extreme point whose amplitude difference is greater than the predetermined difference as a first set; calculating the absolute value of the amplitude difference of every two adjacent extreme points in the first set and the index value difference of every two adjacent extreme points in the first set, and recording the absolute value of the amplitude difference and the absolute value of the index value as a second set; and obtaining the extreme point where the absolute value of the amplitude difference in the second set is greater than A/2, and obtaining the first P extreme value points in a descending order of the absolute value of the amplitude difference.

In some embodiments, the radar controller 104 determining whether there are at least two target index values satisfying a predetermined time domain characteristic conditions in the P index values may include combining P index values in pairs, using the smaller index value of the combined two index values as a left boundary index value, and using the larger index value of the combined two index values as a right boundary index value; for each combination, calculating an index value difference between the right boundary index value and the left boundary index value, selecting M1 extreme points forward from the left boundary index value based on the order of the distance between the index value and the left boundary index value from small to large, selecting M2 extreme points backward from the right boundary index value based on the order of the distance between the index value and the right boundary index value from small to large, where M1 and M2 may both be positive integers; determining whether the index value difference between the right boundary index value and the left boundary index value satisfies a first predetermined time domain characteristic condition, and determining whether the M1 extreme value points and the M2 extreme value points satisfy a second predetermined time domain characteristic condition; using the two index values as two target index values when the index value difference between the right boundary index value and the left boundary index value satisfies the first predetermined time domain characteristic condition, and when the M1 extreme value points and the M2 extreme value points satisfy the second predetermined time domain characteristic condition. The first predetermined time domain characteristic condition may be that the index value difference between the right boundary index value and the left boundary index value is less than a first predetermined interval value. The second predetermined time domain characteristic condition may include the index value difference of the M1 extreme points being less than a second predetermined interval value, and the index value difference of the M2 extreme points being less than the second predetermined interval value. The absolute mean value of the amplitude difference of the M1 extreme points may be less than half of the maximum absolute value of the amplitude difference in the second set, and the absolute mean value of the amplitude difference of the M2 extreme points may be less than half of the maximum absolute value of the amplitude difference in the second set.

In some embodiments, the radar controller 104 eliminating the interference signal may include using a middle position of the two target index values as a center index value when the target index value satisfying the predetermined time domain characteristic condition is two; when the target index value satisfying the predetermined time domain characteristic condition is greater than two, in all the combinations satisfying the condition, selecting the combination with the largest absolute value of the amplitude difference corresponding to the extreme point as the target index value combination, and using the middle position of the two target index values corresponding to the target index value combination as the center index value (for example, the middle position of the absolute value of the amplitude difference of the M1 extreme points and the absolute value of the amplitude difference of the M2 extreme points in all combinations corresponding to the largest absolute value may be used as the center index value); extending a predetermined sampling point length divided by 2 sampling points forward and backward respectively with the center index value as the center, and using the extended period of time as the burst interference part; and setting the amplitude of all sampling points in the burst interference part to an average value of the amplitudes of the N sampling points.

In some embodiments, the index value, target index value, left boundary index value, right boundary index value, and center index value may all be points in time, and the index value difference may be a difference between points in time.

Figure 8:
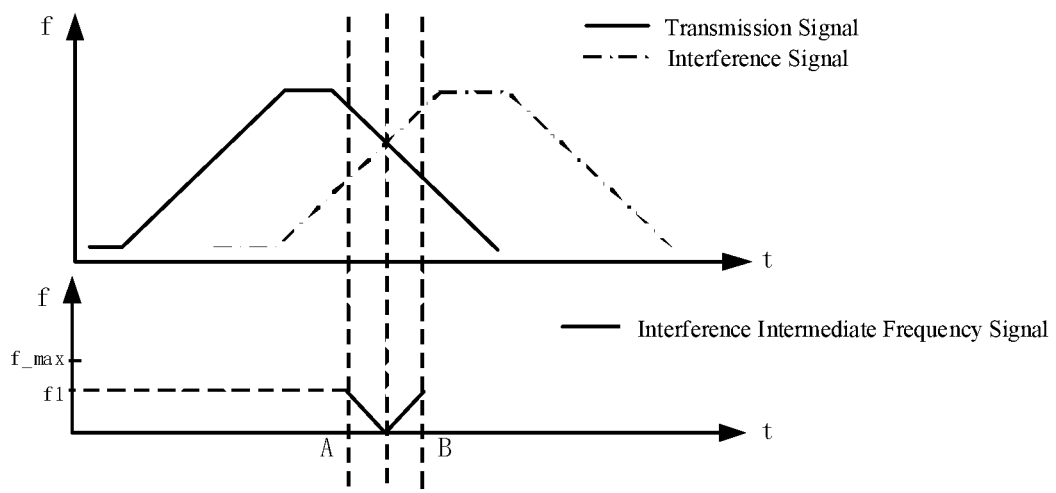
FIG. 8 is a schematic diagram of a burst interference of the trapezoidal modulation waveform according to an embodiment of the present disclosure.

When there is no fixed delay relationship between the two microwave radars transmission signals, some interference signals with a frequency lower than the maximum effective receiving frequency of the intermediate frequency filter may enter the system. Since the frequency of this part of the interference signal is within the effective signal bandwidth of the microwave radar, it cannot be filtered out from the frequency domain. Therefore, the present disclosure proposes to perform a feature extraction on the signal in the time domain to identify the interference signal part and perform interference cancellation compensation. As shown in FIG. 8, when the modulation waveform between two microwave radars has the above relationship, an intermediate frequency interference signal with a frequency less than f1 may be generated. f1 may be less than the maximum receiving frequency f_max of the intermediate frequency filter of the radar receiver, such that the intermediate frequency filter cannot filter out the interference signal.

Figure 9:
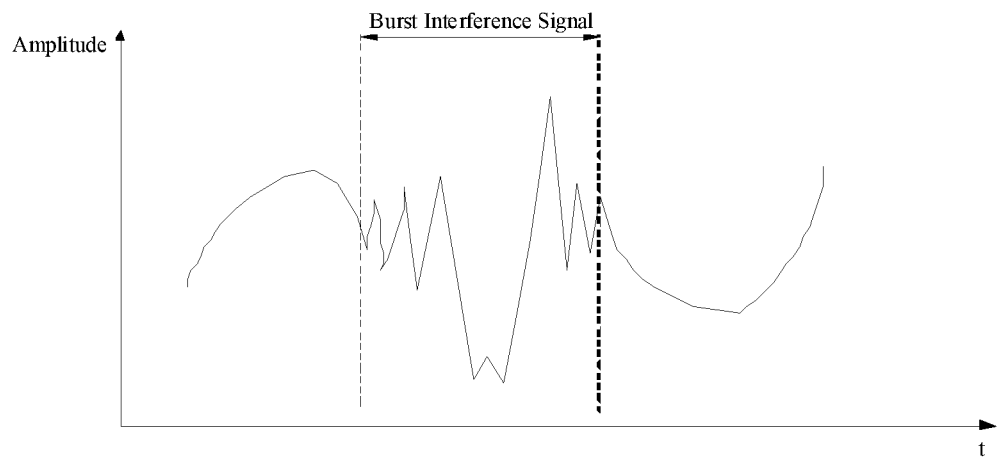
FIG. 9 is a schematic diagram of a time domain signal corresponding to an interference signal of an AB segment shown in FIG. 8.

The schematic diagram of the time domain signal corresponding to the interference signal of a segment AB in FIG. 8 is shown in FIG. 9. The area within the dashed lines in FIG. 9 is the interference signal part of the segment AB in FIG. 8. Because its shape is similar to a burst signal, it is referred to as a burst interference signal. By observing this signal, it is found that the signal frequency of the signal gradually decreases and then gradually increases, while the signal amplitude gradually increases then gradually decreases, which is the characteristic of the burst signal.

Figure 10:
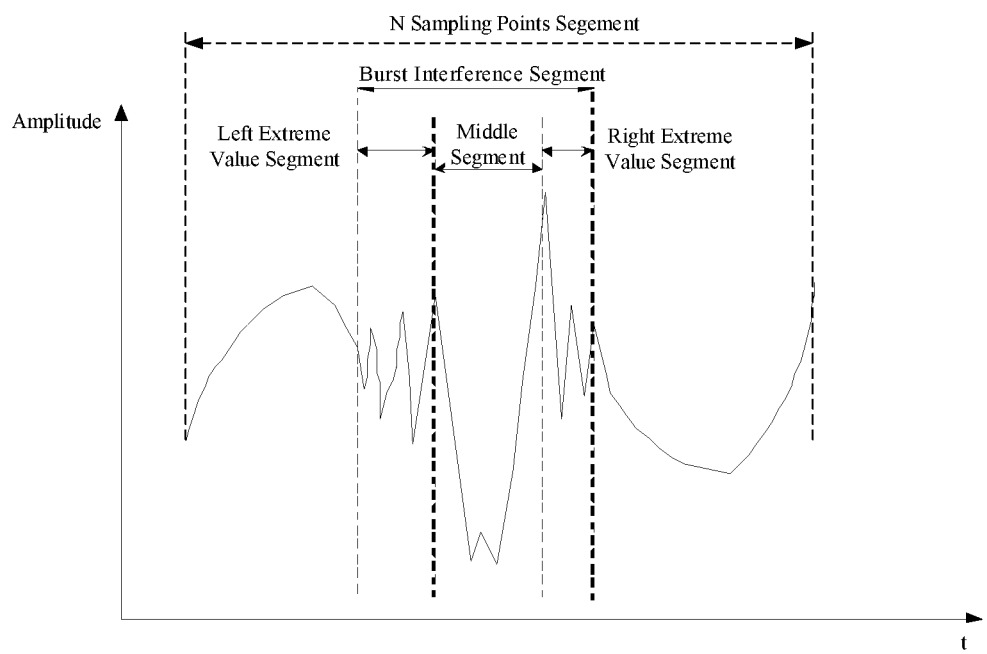
FIG. 10 is a schematic diagram of a segmented extraction of the burst interference signal according to an embodiment of the present disclosure.
Figure 11:
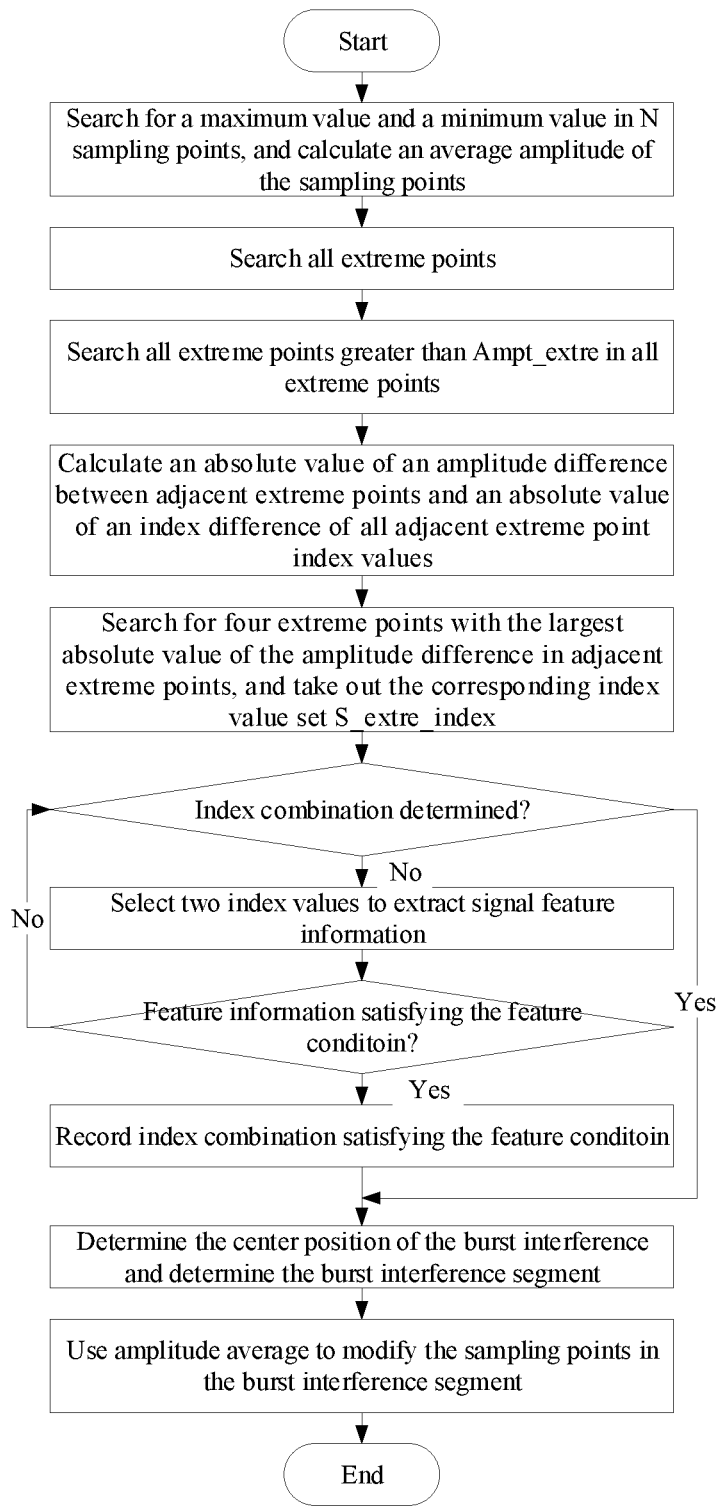
FIG. 11 is a flowchart of a method for identifying and eliminating the burst interference signal according to an embodiment of the present disclosure.

A method for identifying and eliminating the burst interference signal in the present disclosure will be described below. In the present disclosure, it is assumed that a group of radar intermediate frequency signals contains N sampling points. As shown in FIG. 10, the burst interference part is divided into a middle segment, a left extreme value segment, and a right extreme value segment, and feature extraction is performed respectively. Only when the three characteristics are satisfied at the same time can an interference be considered as a burst interference. The specific implementation process of this method is shown in FIG. 11, which will be described in detail below.

1, searching for a maximum value and a minimum value of N sampling points, and recording their amplitude difference as amplitude Ampt_max; and calculating a mean value of the amplitude of N sampling points and recording it as Ampt_mean.

2, searching all extreme points in N sampling points, and recording the amplitude of these extreme points and their positions in the N sampling points (that is, the index value).

3, identifying all extreme points whose difference between two adjacent extreme points is greater than Ampt_extre from the extreme points obtained in the process at 2, recording the amplitude of these extreme points and their index values, and recording them as a set S_extre. Ampt_extre represents a reference extreme value difference. The Ampt_extre can be set and adjusted based on the specific situation, the main purpose is to filter out some extreme points with very small change.

4, obtaining an absolute value of the amplitude difference of all adjacent extreme points in the set S_extre and an absolute value of the index difference of the index value of all 5, identifying all extreme points whose absolute value of the amplitude difference between adjacent extreme points in the set S_extre_delta may be greater than Ampt_max/2, extracting four extreme points with the largest absolute value of the amplitude difference (where there are less than four, an actual number shall prevail), and recording the index values of the four extreme points as a set S_extre_index.

6, combining the index values in S_extre_index in pairs, and performing the processes at 7 to 9 respectively.

7, selecting two index values from S_extra_index and using the smaller value as the left boundary of the middle segment, and the larger value as the right boundary, and calculating their difference to see if the difference is less than C_index_mid, where C_index_mid represents the index spacing value of a predetermined middle segment, and this value can be set based on the specific situation.

8, from the left boundary of the middle segment to the left (forward in time), selecting the amplitude difference of M extreme points closest to the left boundary of the middle segment from S_extra_delta, and determining whether these extreme values satisfy the following characteristic conditions.

(1) Determine whether the index difference of these extreme points is less than C_index_edge, where C_index_edge represents the index spacing value of a predetermined left (or right) extreme small segment.

(2) Calculate a mean_edge of the absolute value of the amplitude difference of the M extreme points, extract the maximum value extre_delta_max of the absolute vale of the amplitude difference of the extreme points in S_extra_delta, and determine whether the mean_edge is less than extra_delta_max/2.

9, using the method at 8 to calculate whether the right extreme value small segment satisfies the characteristic conditions.

10, the two index values satisfying the characteristic conditions in the processes at 7 to 9 at the same time may be the target index values to be identified. When more than one set 11, using the middle position of a set of target index values obtained in the process at 10 as the center position of the burst interference.

12, extending the center position of the burst interference obtained in the process at 11 to the left and right by band/2 sampling points as the burst interference segment, the band representing the sampling point length of the predetermined burst interference segment.

13, modifying all the sample values of the points in the burst interference segment to Ampt_mean, which means that the burst interference elimination of N sampling points is completed.

Figure 12:
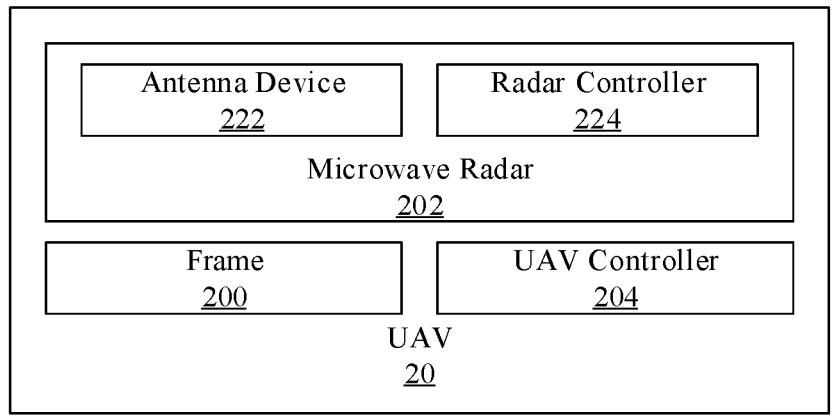
FIG. 12 is a schematic block diagram of a UAV according to an embodiment of the present disclosure.

A second aspect of the present disclosure provides a UAV. FIG. 12 is a schematic block diagram of a UAV 20 according to an embodiment of the present disclosure. The UAV 20 includes a frame 20, a microwave radar 202 disposed on the frame 200. The microwave radar 202 includes an antenna device 222 configured to transmit microwave signals and/or obtain received signals. Both the microwave transmitting signal and the receiving signal can be trapezoidal modulation waveforms. One cycle of the trapezoidal modulation waveforms may include a frequency rising part (rising edge), a frequency falling part (falling edge), and a fixed frequency part. The microwave radar 202 further includes a radar controller 224 in communication connection with the antenna device 222. The antenna device 222 may be configured to send the intermediate frequency signal mixed by the frequency of the microwave transmission signal and the received signal to the radar controller 224, and the radar controller 224 may be configured to determine whether the received signal is an interference signal based on the intermediate frequency signal.

The UAV 20 may further includes an aircraft controller 204. When the radar controller 224 determines that the received signal is not an interference signal, the aircraft controller 204 may determine the coordinate information of a detection target corresponding to the received signal, and update the UAV's trajectory based on the coordinate information of the detection target.

In some embodiments, the microwave radar 202 may be disposed on the UAV 20. The radar controller 224 may include one or more microprocessors. The microwave radar 202 may further include a signal transmitter, a signal receiver, a filter, a mixer, and the like.

In some embodiments, the radar controller 224 determining whether the received signal is an interference signal based on the intermediate frequency signal may include determining a first constant frequency of the intermediate frequency signal corresponding to the frequency rising part of the received signal and a second constant frequency of the intermediate frequency signal corresponding to the frequency falling part of the received signal based on the intermediate frequency signal; and, determining whether the received is an interference signal based on the first constant frequency and the second constant frequency.

In some embodiments, the radar controller 224 determining whether the received is an interference signal based on the first constant frequency and the second constant frequency may include calculating a frequency difference between the first constant frequency and the second constant frequency and determining whether the received signal is an interference signal based on a magnitude relationship between the frequency difference and a predetermined threshold.

In some embodiments, the radar controller 224 determining whether the received signal is an interference signal based on the magnitude relationship between the frequency difference and the predetermined threshold may include determining that the received signal is an interference signal when the frequency difference is greater than or equal to the predetermined threshold; and, determining that the received signal is an echo signal of the microwave transmission signal when the frequency difference is less than the predetermined threshold.

In some embodiments, the radar controller 224 may be further configured to set the delay of the fixed frequency range of the microwave transmission signal and the delay of the fixed frequency range of the microwave transmission signal of other microwave radars to be greater than a predetermined value. For example, a delay t1 of the fixed frequency range of the microwave transmission signal and a delay t2 of the fixed frequency range of the microwave transmission signal of other microwave radars may be set to satisfy a predetermined relationship $$\text{of } |t1 - t2| \geq \frac{2 \times F_{max}}{CSR},$$

where $F_{max}$ is the maximum effective bandwidth of the microwave radar filter, and CSR is the slope of the frequency rising part or the frequency falling part.

The UAV 20 provided in the present disclosure includes a frame 200, a microwave radar 202, and an aircraft controller 204. The microwave radar 202 includes an antenna device 222 and a radar controller 224. The radar controller 224 can control the antenna device 222 to transmit the microwave transmission signal of the trapezoidal modulation waveform and receive the received signal of the trapezoidal modulation waveform, and the trapezoidal modulation waveform may be different from the triangular waveform in the related technology. That is, the trapezoidal modulation waveform can be generated by adding a fixed frequency delay for a certain period of time at the transition between the rising and falling edges of the triangular wave. The radar controller 224 can obtain an intermediate frequency signal that may be a mixture of the frequency microwave transmission signal and the received signal, compare the frequency difference between the first constant frequency of the intermediate frequency signal corresponding to the frequency rising part of the received signal and the second constant frequency of the intermediate frequency signal corresponding to the frequency falling part of the received with the predetermined threshold, and determine whether the received signal is an interference signal, that is, the received signal is another microwave radar, of the microwave transmission signal based on the comparison result. When it is determined that the received signal is an interference signal, the aircraft controller can determine the coordinate information of the detection target corresponding to the received signal, and update the UAV's trajectory based on the coordinate information of the detection target. By using the technical solutions of the present disclosure, there is no need to artificially strictly control the signal transmission time of each microwave radar. That is, there is no need to perform time synchronization of multiple microwave radars, which is simpler and more convenient, and has wider applications.

In some embodiments, the radar controller 224 may be further configured to eliminate the interference signal after determining that the received signal is an interference signal.

The principle of the method of using trapezoidal modulation waveform to resist the same frequency interference of microwave radar is shown in FIG. 6. The upper portion of the FIG. 6 includes a transmitted signal (microwave transmission signal), an echo signal (the reflected signal of the transmitted signal), and an interference signal of the trapezoidal modulation waveform represented by the solid line, the dashed line, and the dotted horizontal line, respectively. Different microwave radars may have different delays in fixed frequency bands in the trapezoidal modulation waveforms. In the upper portion of FIG. 6, it is assumed that the delay of the fixed frequency part in the transmitted signal of the target microwave radar is ti, and the delay of the fixed frequency part in the interference signal of the received interference radar is tj. Since the echo signal is the signal received by the reflection of the transmitted signal, the fixed frequency range delay in the echo signal may be the same as the fixed frequency range delay of the transmitted signal, which is ti. The lower portion of FIG. 6 illustrates the echo intermediate frequency signal and the interference intermediate frequency signal obtained after mixing the radar receiver, where the dashed line represents the echo intermediate frequency signal, the dotted horizontal line represents the interference intermediate frequency signal, f1 and f3 respectively represent the intermediate frequency signal frequency corresponding to the rising edge and falling edge of the trapezoidal modulation waveform of the echo signal, and f2 and f4 respectively represent the intermediate frequency signal frequency corresponding to the rising edge and falling edge of the trapezoidal modulation waveform of the interference signal.

The microwave radar anti-co-frequency interference method provided by the present disclosure is as follow.
 (1) Set different fixed frequency delays in the trapezoidal modulation waveforms of multiple microwave radars.
 (2) Extract the frequency point of the intermediate frequency signal corresponding to the target signal after processing the intermediate frequency signal of the microwave radar, the rising edge part including f1 and f3, and the falling edge part including f2 and f4.
 (3) Since transmission signal of the microwave radar itself may have the same fixed frequency delay as the echo signal, therefore, f1=f3, and the fixed frequency delay of the interference microwave radar signal may be different from that of the microwave radar signal itself, therefore, f2≠f4. Therefore, f1 and f3 may be determined as the effective targets (that is, the signals corresponding to f1 and f3 are echo signals), and when the frequency difference between f4 and f2 is greater than or equal to the predetermined threshold, the signals corresponding to f2 and f4 may be determined as the interference signals.

(4) The fixed frequency delay value of the transmitted signal of different microwave radars may adopt the following setting rules:

$$|t1 - t2| \geq \frac{2 \times F_{max}}{CSR} \quad (1)$$

where t1 represents the fixed frequency range delay of the transmitted signal of the microwave radar itself, t2 represents the fixed frequency range delay of the transmitted signal of other microwave radars, $F_{max}$ represents the maximum effective bandwidth of the filter of the microwave radar itself, and CSR represents the slope of the frequency rising part or the frequency falling part.

The reason why it is needed to set the fixed frequency range delay between two microwave radars to be greater than a fixed value is to filter out the radar interference in a special situation as show in FIG. 7. In FIG. 7, the fixed frequency range delay of the transmission signal of the microwave radar itself is t1, the fixed frequency range delay of the interference signal is t2, and t2=2×t1. At this time f2=f4, and the interference signal cannot be filtered out by comparing the frequency points of the rising edge and the falling edge. However, when t1 and t2 satisfy Formula (1), f2=f4>$F_{max}$, therefore, the interference signal may be filtered out by the intermediate frequency filter of the radar receiver.

In some embodiments, the radar controller 224 may be further configured to determine the signal frequency of the intermediate frequency signal and the change information of the signal amplitude based on the intermediate frequency signal, and determine whether the received signal is an interference signal based on the change information of the signal frequency and the signal amplitude of the intermediate frequency signal.

In some embodiments, the radar controller 224 determining whether the received signal is an interference signal based on the change information of the signal frequency and the signal amplitude of the intermediate frequency signal may include determining the received signal is an interference signal if the change state of the signal frequency of the received signal is gradually decreasing and then gradually increasing, and the change state of the signal amplitude is gradually increasing and then gradually decreasing.

In some embodiments, the radar controller 224 determining whether the received signal is an interference signal based on the change information of the signal frequency and the signal amplitude of the intermediate frequency signal may include obtaining the signal amplitude information of N sampling points of the intermediate frequency signal; selecting P extreme value points based on the signal amplitude information of N sampling points, where P is a positive integer greater than or equal to two and less than N; and determining whether the received signal is an interference signal based on the index values of the P extreme points.

In some embodiments, the radar controller 224 selecting P extreme value points based on the signal amplitude information of N sampling points may include, based on the amplitude information of N sampling points of the intermediate frequency signal, determining a maximum amplitude point and a minimum amplitude point in the N sampling points, calculating the amplitude difference between the maximum amplitude point and the minimum amplitude point, and recording the amplitude difference as a first difference; obtaining P extreme value points whose amplitude difference with the adjacent extreme value point is greater than A/2 from the N sampling points; and recording the index value of each extreme point in P extreme value points, and obtaining the P index values, where P is a positive integer greater than or equal to two and less than N.

In some embodiments, the radar controller 224 determining whether the received signal is an interference signal based on the index values of the P extreme points may include determining whether there are at least two target index values satisfying a predetermined time domain characteristic conditions in the P index values; and determining that the received signal is a burst interference signal in a time period corresponding to a fluctuation frequency after determining there are at least two target index values satisfying the predetermined time domain characteristic conditions in the P index values.

In some embodiments, the radar controller 224 obtaining P extreme value points whose amplitude difference with the adjacent extreme value point is greater than A/2 from the N sampling points may include obtaining all extreme points in the N sampling points, calculating the amplitude difference between every two adjacent extreme points, and recording the amplitude of the extreme point whose amplitude difference is greater than a predetermined difference and the index value of the extreme point whose amplitude difference is greater than the predetermined difference as a first set; calculating the absolute value of the amplitude difference of every two adjacent extreme points in the first set and the index value difference of every two adjacent extreme points in the first set, and recording the absolute value of the amplitude difference and the absolute value of the index value as a second set; and obtaining the extreme point where the absolute value of the amplitude difference in the second set is greater than A/2, and obtaining the first P extreme value points in a descending order of the absolute value of the amplitude difference.

In some embodiments, the radar controller 224 determining whether there are at least two target index values satisfying a predetermined time domain characteristic conditions in the P index values may include combining P index values in pairs, using the smaller index value of the combined two index values as a left boundary index value, and using the larger index value of the combined two index values as a right boundary index value; for each combination, calculating an index value difference between the right boundary index value and the left boundary index value, selecting M1 extreme points forward from the left boundary index value based on the order of the distance between the index value and the left boundary index value from small to large, selecting M2 extreme points backward from the right boundary index value based on the order of the distance between the index value and the right boundary index value from small to large, where M1 and M2 may both be positive integers; determining whether the index value difference between the right boundary index value and the left boundary index value satisfies a first predetermined time domain characteristic condition, and determining whether the M1 extreme value points and the M2 extreme value points satisfy a second predetermined time domain characteristic condition; using the two index values as two target index values when the index value difference between the right boundary index value and the left boundary index value satisfies the first predetermined time domain characteristic condition, and when the M1 extreme value points and the M2 extreme value points satisfy the second predetermined time domain characteristic condition. The first predetermined time domain characteristic condition may be that the index value difference between the right boundary index value and the left boundary index value is less than a first predetermined interval value. The second predetermined time domain characteristic condition may include the index value difference of the M1 extreme points being less than a second predetermined interval value, and the index value difference of the M2 extreme points being less than the second predetermined interval value. The absolute mean value of the amplitude difference of the M1 extreme points may be less than half of the maximum absolute value of the amplitude difference in the second set, and the absolute mean value of the amplitude difference of the M2 extreme points may be less than half of the maximum absolute value of the amplitude difference in the second set.

In some embodiments, the radar controller 224 eliminating the interference signal may include using a middle position of the two target index values as a center index value when the target index value satisfying the predetermined time domain characteristic condition is two; when the target index value satisfying the predetermined time domain characteristic condition is greater than two, in all the combinations satisfying the condition, selecting the combination with the largest absolute value of the amplitude difference corresponding to the extreme point as the target index value combination, and using the middle position of the two target index values corresponding to the target index value combination as the center index value (for example, the middle position of the absolute value of the amplitude difference of the M1 extreme points and the absolute value of the amplitude difference of the M2 extreme points in all combinations corresponding to the largest absolute value may be used as the center index value); extending a predetermined sampling point length divided by 2 sampling points forward and backward respectively with the center index value as the center, and using the extended period of time as the burst interference part; and setting the amplitude of all sampling points in the burst interference part to an average value of the amplitudes of the N sampling points.

In some embodiments, the index value, target index value, left boundary index value, right boundary index value, and center index value may all be points in time, and the index value difference may be a difference between points in time.

When there is no fixed delay relationship between the two microwave radars transmission signals, some interference signals with a frequency lower than the maximum effective receiving frequency of the intermediate frequency filter may enter the system. Since the frequency of this part of the interference signal is within the effective signal bandwidth of the microwave radar, it cannot be filtered out from the frequency domain. Therefore, the present disclosure proposes to perform a feature extraction on the signal in the time domain to identify the interference signal part and perform interference cancellation compensation. As shown in FIG. 8, when the modulation waveform between two microwave radars has the above relationship, an intermediate frequency interference signal with a frequency less than f1 may be generated. f1 may be less than the maximum receiving frequency f_max of the intermediate frequency filter of the radar receiver, such that the intermediate frequency filter cannot filter out the interference signal.

The schematic diagram of the time domain signal corresponding to the interference signal of a segment AB in FIG. 8 is shown in FIG. 9. The area within the dashed lines in FIG. 9 is the interference signal part of the segment AB in FIG. 8. Because its shape is similar to a burst signal, it is referred to as a burst interference signal. By observing this signal, it is found that the signal frequency of the signal gradually decreases and then gradually increases, while the signal amplitude gradually increases then gradually decreases, which is the characteristic of the burst signal.

A method for identifying and eliminating the burst interference signal in the present disclosure will be described below. In the present disclosure, it is assumed that a group of radar intermediate frequency signals contains N sampling points. As shown in FIG. 10, the burst interference part is divided into a middle segment, a left extreme value segment, and a right extreme value segment, and feature extraction is performed respectively. Only when the three characteristics are satisfied at the same can an interference be considered as a burst interference. The specific implementation process of this method is shown in FIG. 11, which will be described in detail below.

1, searching for a maximum value and a minimum value of N sampling points, and recording their amplitude difference as amplitude Ampt_max; and calculating a mean value of the amplitude of N sampling points and recording it as Ampt_mean.

2, searching all extreme points in N sampling points, and recording the amplitude of these extreme points and their positions in the N sampling points (that is, the index value).

3, identifying all extreme points whose difference between two adjacent extreme points is greater than Ampt_extre from the extreme points obtained in the process at 2, recording the amplitude of these extreme points and their index values, and recording them as a set S_extre. Ampt_extre represents a reference extreme value difference. The Ampt_extre can be set and adjusted based on the specific situation, the main purpose is to filter out some extreme points with very small change.

4, obtaining an absolute value of the amplitude difference of all adjacent extreme points in the set S_extre and an absolute value of the index difference of the index value of all 5, identifying all extreme points whose absolute value of the amplitude difference between adjacent extreme points in the set S_extre_delta may be greater than Ampt_max/2, extracting four extreme points with the largest absolute value of the amplitude difference (where there are less than four, an actual number shall prevail), and recording the index values of the four extreme points as a set S_extre_index.

6, combining the index values in S_extre_index in pairs, and performing the processes at 7 to 9 respectively.

7, selecting two index values from S_extra_index and using the smaller value as the left boundary of the middle segment, and the larger value as the right boundary, and calculating their difference to see if the difference is less than C_index_mid, where C_index_mid represents the index spacing value of a predetermined middle segment, and this value can be set based on the specific situation.

8, from the left boundary of the middle segment to the left (forward in time), selecting the amplitude difference of M extreme points closest to the left boundary of the middle segment from S_extra_delta, and determining whether these extreme values satisfy the following characteristic conditions.

(1) Determine whether the index difference of these extreme points is less than C_index_edge, where C_index_edge represents the index spacing value of a predetermined left (or right) extreme small segment.

(2) Calculate a mean_edge of the absolute value of the amplitude difference of the M extreme points, extract the maximum value extre_delta_max of the absolute vale of the amplitude difference of the extreme points in S_extra_delta, and determine whether the mean_edge is less than extra_delta_max/2.

9, using the method at 8 to calculate whether the right extreme value small segment satisfies the characteristic conditions.

10, the two index values satisfying the characteristic conditions in the processes at 7 to 9 at the same time may be the target index values to be identified. When more than one set 11, using the middle position of a set of target index values obtained in the process at 10 as the center position of the burst interference.

12, extending the center position of the burst interference obtained in the process at 11 to the left and right by band/2 sampling points as the burst interference segment, the band representing the sampling point length of the predetermined burst interference segment.

13, modifying all the sample values of the points in the burst interference segment to Ampt_mean, which means that the burst interference elimination of N sampling points is completed.

After the radar controller 224 eliminates the interference signal, the aircraft controller 204 of the UAV 20 may determine the position of an obstacle based on the echo signal of the microwave transmission signal after the interference signal is eliminated, and control the flight state or the flight trajectory of the UAV based on the position of the obstacle, such as controlling the UAV 20 to stop flying at the position of the obstacle (e.g., hovering at a certain height position) or fly around the obstacle.

Figure 13:
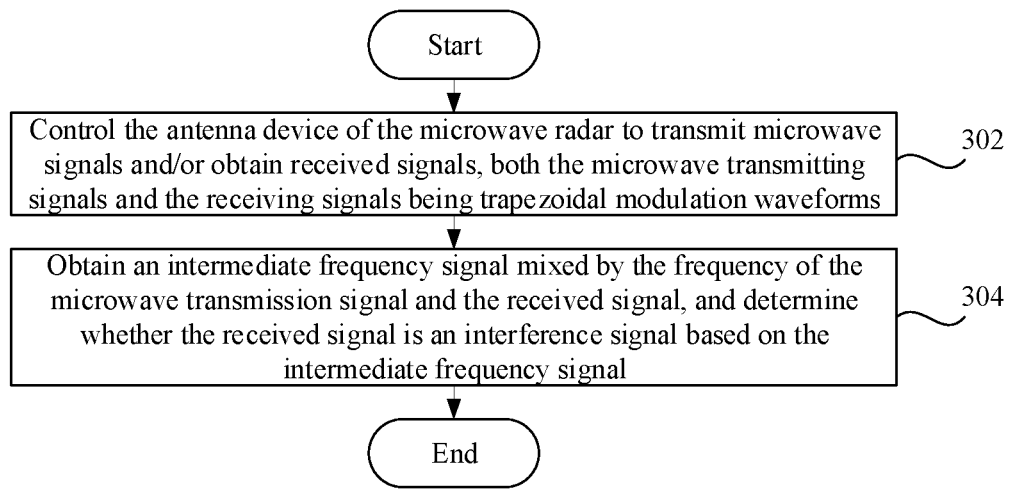
FIG. 13 is a flowchart of a microwave radar signal processing method according to an embodiment of the present disclosure.

A third aspect of the present disclosure provides a signal processing method for microwave radar. FIG. 13 is a flowchart of a microwave radar signal processing method according to an embodiment of the present disclosure. The method will be described in detail below.

302, controlling the antenna device of the microwave radar to transmit microwave signals and/or obtain received signals. Both the microwave transmitting signal and the receiving signal can be trapezoidal modulation waveforms. One cycle of the trapezoidal modulation waveforms may include a frequency rising part (rising edge), a frequency falling part (falling edge), and a fixed frequency part.

304, obtaining an intermediate frequency signal mixed by the frequency of the microwave transmission signal and the received signal, and determining whether the received signal is an interference signal based on the intermediate frequency signal.

In some embodiments, the process at 304 of determining whether the received signal is an interference signal based on the intermediate frequency signal may include determining a first constant frequency of the intermediate frequency signal corresponding to the frequency rising part of the received signal and a second constant frequency of the intermediate frequency signal corresponding to the frequency falling part of the received signal based on the intermediate frequency signal; and, determining whether the received is an interference signal based on the first constant frequency and the second constant frequency.

In some embodiments, determining whether the received is an interference signal based on the first constant frequency and the second constant frequency may include calculating a frequency difference between the first constant frequency and the second constant frequency and determining whether the received signal is an interference signal based on a magnitude relationship between the frequency difference and a predetermined threshold.

In some embodiments, determining whether the received signal is an interference signal based on the magnitude relationship between the frequency difference and the predetermined threshold may include determining that the received signal is an interference signal when the frequency difference is greater than or equal to the predetermined threshold; and, determining that the received signal is an echo signal of the microwave transmission signal when the frequency difference is less than the predetermined threshold.

In some embodiments, the method may be further include setting the delay of the fixed frequency range of the microwave transmission signal and the delay of the fixed frequency range of the microwave transmission signal of other microwave radars to be greater than a predetermined value. For example, a delay t1 of the fixed frequency range of the microwave transmission signal and a delay t2 of the fixed frequency range of the microwave transmission signal of other microwave radars may be set to satisfy a predetermined relationship of $$|t1 - t2| \geq \frac{2 \times F_{max}}{CSR},$$

where $F_{max}$ is the maximum effective bandwidth of the microwave filter, and CSR is the slope of the frequency rising part or the frequency falling part.

The microwave radar signal processing method provided in the present disclosure can control the antenna device of the microwave radar to transmit the microwave transmission signal of the trapezoidal modulation waveform and receive the received signal of the trapezoidal modulation waveform, and the trapezoidal modulation waveform may be different from the triangular waveform in the related technology. That is, the trapezoidal modulation waveform can be generated by adding a fixed frequency delay for a certain period of time at the transition between the rising and falling edges of the triangular wave. Further, the method can obtain an intermediate frequency signal that may be a mixture of the frequency microwave transmission signal and the received signal, compare the frequency difference between the first constant frequency of the intermediate frequency signal corresponding to the frequency rising part of the received signal and the second constant frequency of the intermediate frequency signal corresponding to the frequency falling part of the received with the predetermined threshold, and determine whether the received signal is an interference signal of the microwave transmission signal based on the comparison result. That is, the received signal is other microwave radars. By using the technical solutions of the present disclosure, there is no need to artificially strictly control the signal transmission time of each microwave radar. That is, there is no need to perform time synchronization of multiple microwave radars, which is simpler and more convenient, and has wider applications.

In some embodiments, the method may further include eliminating the interference signal after determining that the received signal is an interference signal.

The principle of the method of using trapezoidal modulation waveform to resist the same frequency interference of microwave radar is shown in FIG. 6. The upper portion of the FIG. 6 includes a transmitted signal (microwave transmission signal), an echo signal (the reflected signal of the transmitted signal), and an interference signal of the trapezoidal modulation waveform represented by the solid line, the dashed line, and the dotted horizontal line, respectively. Different microwave radars may have different delays in fixed frequency bands in the trapezoidal modulation waveforms. In the upper portion of FIG. 6, it is assumed that the delay of the fixed frequency part in the transmitted signal of the target microwave radar is ti, and the delay of the fixed frequency part in the interference signal of the received interference radar is tj. Since the echo signal is the signal received by the reflection of the transmitted signal, the fixed frequency range delay in the echo signal may be the same as the fixed frequency range delay of the transmitted signal, which is ti. The lower portion of FIG. 6 illustrates the echo intermediate frequency signal and the interference intermediate frequency signal obtained after mixing the radar receiver, where the dashed line represents the echo intermediate frequency signal, the dotted horizontal line represents the interference intermediate frequency signal, f1 and f3 respectively represent the intermediate frequency signal frequency corresponding to the rising edge and falling edge of the trapezoidal modulation waveform of the echo signal, and f2 and f4 respectively represent the intermediate frequency signal frequency corresponding to the rising edge and falling edge of the trapezoidal modulation waveform of the interference signal.

The microwave radar anti-co-frequency interference method provided by the present disclosure is as follow.

(1) Set different fixed frequency delays in the trapezoidal modulation waveforms of multiple microwave radars.

(2) Extract the frequency point of the intermediate frequency signal corresponding to the target signal after processing the intermediate frequency signal of the microwave radar, the rising edge part including f1 and f3, and the falling edge part including f2 and f4.

(3) Since transmission signal of the microwave radar itself may have the same fixed frequency delay as the echo signal, therefore, f1=f3, and the fixed frequency delay of the interference microwave radar signal may be different from that of the microwave radar signal itself, therefore, f2≠f4. Therefore, f1 and f3 may be determined as the effective targets (that is, the signals corresponding to f1 and f3 are echo signals), and when the frequency difference between f4 and f2 is greater than or equal to the predetermined threshold, the signals corresponding to f2 and f4 may be determined as the interference signals.

(4) The fixed frequency delay value of the transmitted signal of different microwave radars may adopt the following setting rules:

$$|t1 - t2| \geq \frac{2 \times F_{max}}{CSR} \quad (1)$$

where t1 represents the fixed frequency range delay of the transmitted signal of the microwave radar itself, t2 represents the fixed frequency range delay of the transmitted signal of other microwave radars, $F_{max}$ represents the maximum effective bandwidth of the filter of the microwave radar itself, and CSR represents the slope of the frequency rising part or the frequency falling part.

The reason why it is needed to set the fixed frequency range delay between two microwave radars to be greater than a fixed value is to filter out the radar interference in a special situation as show in FIG. 7. In FIG. 7, the fixed frequency range delay of the transmission signal of the microwave radar itself is t1, the fixed frequency range delay of the interference signal is t2, and t2=2×t1. At this time f2=f4, and the interference signal cannot be filtered out by comparing the frequency points of the rising edge and the falling edge. However, when t1 and t2 satisfy Formula (1), f2=f4>$F_{max}$, therefore, the interference signal may be filtered out by the intermediate frequency filter of the radar receiver.

In some embodiments, the method may be further include determining the signal frequency of the intermediate frequency signal and the change information of the signal amplitude based on the intermediate frequency signal, and determining whether the received signal is an interference signal based on the change information of the signal frequency and the signal amplitude of the intermediate frequency signal.

In some embodiments, the process of determining whether the received signal is an interference signal based on the change information of the signal frequency and the signal amplitude of the intermediate frequency signal may include determining the received signal is an interference signal if the change state of the signal frequency of the received signal is gradually decreasing and then gradually increasing, and the change state of the signal amplitude is gradually increasing and then gradually decreasing.

In some embodiments, the process of determining whether the received signal is an interference signal based on the change information of the signal frequency and the signal amplitude of the intermediate frequency signal may include obtaining the signal amplitude information of N sampling points of the intermediate frequency signal; selecting P extreme value points based on the signal amplitude information of N sampling points, where P is a positive integer greater than or equal to two and less than N; and determining whether the received signal is an interference signal based on the index values of the P extreme points.

It should be noted that, at this time, the method can be used to obtain the first constant frequency of the intermediate frequency signal corresponding to the frequency rising part of the received signal and the second constant frequency of the intermediate frequency signal corresponding to the frequency falling part of the received signal, and calculate the frequency difference between the first constant frequency and the second constant frequency. When the frequency difference is greater than or equal to the predetermined threshold, the received signal may be determined as the interference signal of the microwave transmission signal. When the frequency difference is less than the predetermined threshold, the received signal may be determined as the echo signal of the microwave transmission signal, which may also exist at the same time.

In some embodiments, selecting P extreme value points based on the signal amplitude information of N sampling points may include, based on the amplitude information of N sampling points of the intermediate frequency signal, determining a maximum amplitude point and a minimum amplitude point in the N sampling points, calculating the amplitude difference between the maximum amplitude point and the minimum amplitude point, and recording the amplitude difference as a first difference; obtaining P extreme value points whose amplitude difference with the adjacent extreme value point is greater than A/2 from the N sampling points; and recording the index value of each extreme point in P extreme value points, and obtaining the P index values, where P is a positive integer greater than or equal to two and less than N.

In some embodiments, determining whether the received signal is an interference signal based on the index values of the P extreme points may include determining whether there are at least two target index values satisfying a predetermined time domain characteristic conditions in the P index values; and determining that the received signal is a burst interference signal in a time period corresponding to a fluctuation frequency after determining there are at least two target index values satisfying the predetermined time domain characteristic conditions in the P index values.

In some embodiments, obtaining P extreme value points whose amplitude difference with the adjacent extreme value point is greater than A/2 from the N sampling points may include obtaining all extreme points in the N sampling points, calculating the amplitude difference between every two adjacent extreme points, and recording the amplitude of the extreme point whose amplitude difference is greater than a predetermined difference and the index value of the extreme point whose amplitude difference is greater than the predetermined difference as a first set; calculating the absolute value of the amplitude difference of every two adjacent extreme points in the first set and the index value difference of every two adjacent extreme points in the first set, and recording the absolute value of the amplitude difference and the absolute value of the index value as a second set; and obtaining the extreme point where the absolute value of the amplitude difference in the second set is greater than A/2, and obtaining the first P extreme value points in a descending order of the absolute value of the amplitude difference.

In some embodiments, determining whether there are at least two target index values satisfying a predetermined time domain characteristic conditions in the P index values may include combining P index values in pairs, using the smaller index value of the combined two index values as a left boundary index value, and using the larger index value of the combined two index values as a right boundary index value; for each combination, calculating an index value difference between the right boundary index value and the left boundary index value, selecting M1 extreme points forward from the left boundary index value based on the order of the distance between the index value and the left boundary index value from small to large, selecting M2 extreme points backward from the right boundary index value based on the order of the distance between the index value and the right boundary index value from small to large, where M1 and M2 may both be positive integers; determining whether the index value difference between the right boundary index value and the left boundary index value satisfies a first predetermined time domain characteristic condition, and determining whether the M1 extreme value points and the M2 extreme value points satisfy a second predetermined time domain characteristic condition; using the two index values as two target index values when the index value difference between the right boundary index value and the left boundary index value satisfies the first predetermined time domain characteristic condition, and when the M1 extreme value points and the M2 extreme value points satisfy the second predetermined time domain characteristic condition. The first predetermined time domain characteristic condition may be that the index value difference between the right boundary index value and the left boundary index value is less than a first predetermined interval value. The second predetermined time domain characteristic condition may include the index value difference of the M1 extreme points being less than a second predetermined interval value, and the index value difference of the M2 extreme points being less than the second predetermined interval value. The absolute mean value of the amplitude difference of the M1 extreme points may be less than half of the maximum absolute value of the amplitude difference in the second set, and the absolute mean value of the amplitude difference of the M2 extreme points may be less than half of the maximum absolute value of the amplitude difference in the second set.

In some embodiments, eliminating the interference signal may include using a middle position of the two target index values as a center index value when the target index value satisfying the predetermined time domain characteristic condition is two; when the target index value satisfying the predetermined time domain characteristic condition is greater than two, in all the combinations satisfying the condition, selecting the combination with the largest absolute value of the amplitude difference corresponding to the extreme point as the target index value combination, and using the middle position of the two target index values corresponding to the target index value combination as the center index value (for example, the middle position of the absolute value of the amplitude difference of the M1 extreme points and the absolute value of the amplitude difference of the M2 extreme points in all combinations corresponding to the largest absolute value may be used as the center index value); extending a predetermined sampling point length divided by 2 sampling points forward and backward respectively with the center index value as the center, and using the extended period of time as the burst interference part; and setting the amplitude of all sampling points in the burst interference part to an average value of the amplitudes of the N sampling points.

In some embodiments, the index value, target index value, left boundary index value, right boundary index value, and center index value may all be points in time, and the index value difference may be a difference between points in time.

When there is no fixed delay relationship between the two microwave radars transmission signals, some interference signals with a frequency lower than the maximum effective receiving frequency of the intermediate frequency filter may enter the system. Since the frequency of this part of the interference signal is within the effective signal bandwidth of the microwave radar, it cannot be filtered out from the frequency domain. Therefore, the present disclosure proposes to perform a feature extraction on the signal in the time domain to identify the interference signal part and perform interference cancellation compensation. As shown in FIG. 8, when the modulation waveform between two microwave radars has the above relationship, an intermediate frequency interference signal with a frequency less than f1 may be generated. f1 may be less than the maximum receiving frequency f_max of the intermediate frequency filter of the radar receiver, such that the intermediate frequency filter cannot filter out the interference signal.

The schematic diagram of the time domain signal corresponding to the interference signal of a segment AB in FIG.

8 is shown in FIG. 9. The area within the dashed lines in FIG. 9 is the interference signal part of the segment AB in FIG. 8. Because its shape is similar to a burst signal, it is referred to as a burst interference signal. By observing this signal, it is found that the signal frequency of the signal gradually decreases and then gradually increases, while the signal amplitude gradually increases then gradually decreases, which is the characteristic of the burst signal.

A method for identifying and eliminating the burst interference signal in the present disclosure will be described below. In the present disclosure, it is assumed that a group of radar intermediate frequency signals contains N sampling points. As shown in FIG. 10, the burst interference part is divided into a middle segment, a left extreme value segment, and a right extreme value segment, and feature extraction is performed respectively. Only when the three characteristics are satisfied at the same can an interference be considered as a burst interference. The specific implementation process of this method is shown in FIG. 11, which will be described in detail below.

1, searching for a maximum value and a minimum value of N sampling points, and recording their amplitude difference as amplitude Ampt_max; and calculating a mean value of the amplitude of N sampling points and recording it as Ampt_mean.

2, searching all extreme points in N sampling points, and recording the amplitude of these extreme points and their positions in the N sampling points (that is, the index value).

3, identifying all extreme points whose difference between two adjacent extreme points is greater than Ampt_extre from the extreme points obtained in the process at 2, recording the amplitude of these extreme points and their index values, and recording them as a set S_extre. Ampt_extre represents a reference extreme value difference. The Ampt_extre can be set and adjusted based on the specific situation, the main purpose is to filter out some extreme points with very small change.

4, obtaining an absolute value of the amplitude difference of all adjacent extreme points in the set S_extre and an absolute value of the index difference of the index value of all 5, identifying all extreme points whose absolute value of the amplitude difference between adjacent extreme points in the set S_extre_delta may be greater than Ampt_max/2, extracting four extreme points with the largest absolute value of the amplitude difference (where there are less than four, an actual number shall prevail), and recording the index values of the four extreme points as a set S_extre_index.

6, combining the index values in S_extre_index in pairs, and performing the processes at 7 to 9 respectively.

7, selecting two index values from S_extra_index and using the smaller value as the left boundary of the middle segment, and the larger value as the right boundary, and calculating their difference to see if the difference is less than C_index_mid, where C_index_mid represents the index spacing value of a predetermined middle segment, and this value can be set based on the specific situation.

8, from the left boundary of the middle segment to the left (forward in time), selecting the amplitude difference of M extreme points closest to the left boundary of the middle segment from S_extra_delta, and determining whether these extreme values satisfy the following characteristic conditions.

(1) Determine whether the index difference of these extreme points is less than C_index_edge, where C_index_edge represents the index spacing value of a predetermined left (or right) extreme small segment.

(2) Calculate a mean_edge of the absolute value of the amplitude difference of the M extreme points, extract the maximum value extre_delta_max of the absolute vale of the amplitude difference of the extreme points in S_extra_delta, and determine whether the mean_edge is less than extra_delta_max/2.

9, using the method at 8 to calculate whether the right extreme value small segment satisfies the characteristic conditions.

10, the two index values satisfying the characteristic conditions in the processes at 7 to 9 at the same time may be the target index values to be identified. When more than one set 11, using the middle position of a set of target index values obtained in the process at 10 as the center position of the burst interference.

12, extending the center position of the burst interference obtained in the process at 11 to the left and right by band/2 sampling points as the burst interference segment, the band representing the sampling point length of the predetermined burst interference segment.

13, modifying all the sample values of the points in the burst interference segment to Ampt_mean, which means that the burst interference elimination of N sampling points is completed.

Figure 14:
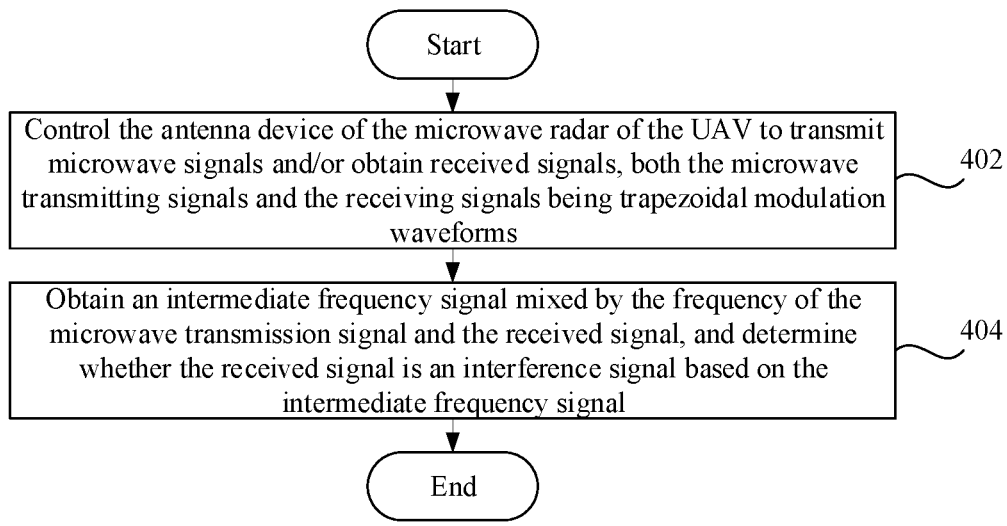
FIG. 14 is a flowchart of a UAV control method according to an embodiment of the present disclosure.

A fourth aspect of the present disclosure provides a UAV control method. FIG. 14 is a flowchart of a UAV control method according to an embodiment of the present disclosure. The control method will be described in detail below.

402, controlling the antenna device of the microwave radar of the UAV to transmit microwave signals and/or obtain received signals. Both the microwave transmitting signal and the receiving signal can be trapezoidal modulation waveforms. One cycle of the trapezoidal modulation waveforms may include a frequency rising part (rising edge), a frequency falling part (falling edge), and a fixed frequency part.

404, obtaining an intermediate frequency signal mixed by the frequency of the microwave transmission signal and the received signal, and determining whether the received signal is an interference signal based on the intermediate frequency signal.

Figure 15:
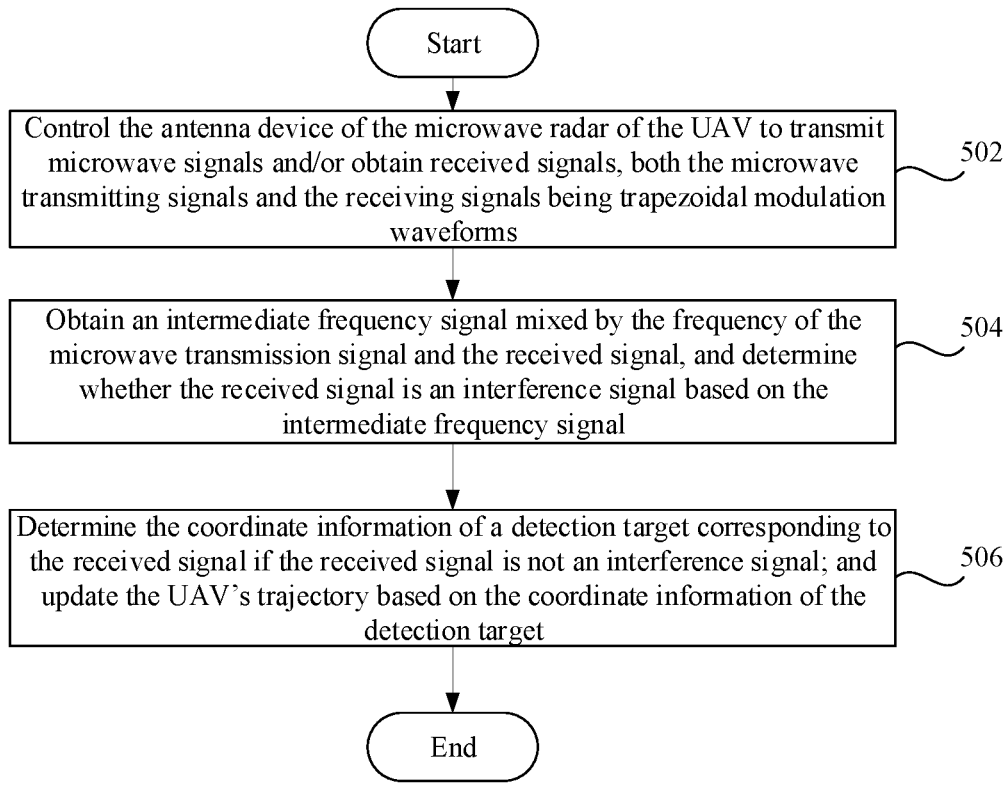
FIG. 15 is a flowchart of the UAV control method according to another embodiment of the present disclosure.

FIG. 15 is a flowchart of the UAV control method according to another embodiment of the present disclosure. The control method will be described in detail below.

502, controlling the antenna device of the microwave radar of the UAV to transmit microwave signals and/or obtain received signals. Both the microwave transmitting signal and the receiving signal can be trapezoidal modulation waveforms. One cycle of the trapezoidal modulation waveforms may include a frequency rising part (rising edge), a frequency falling part (falling edge), and a fixed frequency part.

504, obtaining an intermediate frequency signal mixed by the frequency of the microwave transmission signal and the received signal, and determining whether the received signal is an interference signal based on the intermediate frequency signal.

506, determining the coordinate information of a detection target corresponding to the received signal if the received signal is not an interference signal; and updating the UAV's trajectory based on the coordinate information of the detection target.

In some embodiments, the process at 404 or 504 of determining whether the received signal is an interference signal based on the intermediate frequency signal may include determining a first constant frequency of the intermediate frequency signal corresponding to the frequency rising part of the received signal and a second constant frequency of the intermediate frequency signal corresponding to the frequency falling part of the received signal based on the intermediate frequency signal; and, determining whether the received is an interference signal based on the first constant frequency and the second constant frequency.

In some embodiments, determining whether the received is an interference signal based on the first constant frequency and the second constant frequency may include calculating a frequency difference between the first constant frequency and the second constant frequency and determining whether the received signal is an interference signal based on a magnitude relationship between the frequency difference and a predetermined threshold.

In some embodiments, determining whether the received signal is an interference signal based on the magnitude relationship between the frequency difference and the predetermined threshold may include determining that the received signal is an interference signal when the frequency difference is greater than or equal to the predetermined threshold; and, determining that the received signal is an echo signal of the microwave transmission signal when the frequency difference is less than the predetermined threshold.

In some embodiments, the method may be further include setting the delay of the fixed frequency range of the microwave transmission signal and the delay of the fixed frequency range of the microwave transmission signal of other microwave radars to be greater than a predetermined value. For example, a delay t1 of the fixed frequency range of the microwave transmission signal and a delay t2 of the fixed frequency range of the microwave transmission signal of other microwave radars may be set to satisfy a predetermined relationship of $$|t1 - t2| \geq \frac{2 \times F_{max}}{CSR},$$

where $F_{max}$ is the maximum effective bandwidth of the microwave filter, and CSR is the slope of the frequency rising part or the frequency falling part.

The UAV control method provided in the present disclosure can control the antenna device of the UAV to transmit the microwave transmission signal of the trapezoidal modulation waveform and receive the received signal of the trapezoidal modulation waveform, and the trapezoidal modulation waveform may be different from the triangular waveform in the related technology. That is, the trapezoidal modulation waveform can be generated by adding a fixed frequency delay for a certain period of time at the transition between the rising and falling edges of the triangular wave. Further, the method can obtain an intermediate frequency signal that may be a mixture of the frequency microwave transmission signal and the received signal, compare the frequency difference between the first constant frequency of the intermediate frequency signal corresponding to the frequency rising part of the received signal and the second constant frequency of the intermediate frequency signal corresponding to the frequency falling part of the received with the predetermined threshold, and determine whether the received signal is an interference signal of the microwave transmission signal, that is, the received signal being the microwave transmission signal of other microwave radars, based on the comparison result. When it is determined that the received signal is not an interference signal, the coordinate information of the detection target corresponding to the received signal may be determined, and the UAV's trajectory may be updated based on the coordinate information of the detection target. By using the technical solutions of the present disclosure, there is no need to artificially strictly control the signal transmission time of each microwave radar. That is, there is no need to perform time synchronization of multiple microwave radars, which is simpler and more convenient, and has wider applications.

In some embodiments, method may further include eliminating the interference signal after determining that the received signal is an interference signal.

The principle of the method of using trapezoidal modulation waveform to resist the same frequency interference of microwave radar is shown in FIG. 6. The upper portion of the FIG. 6 includes a transmitted signal (microwave transmission signal), an echo signal (the reflected signal of the transmitted signal), and an interference signal of the trapezoidal modulation waveform represented by the solid line, the dashed line, and the dotted horizontal line, respectively. Different microwave radars may have different delays in fixed frequency bands in the trapezoidal modulation waveforms. In the upper portion of FIG. 6, it is assumed that the delay of the fixed frequency part in the transmitted signal of the target microwave radar is ti, and the delay of the fixed frequency part in the interference signal of the received interference radar is tj. Since the echo signal is the signal received by the reflection of the transmitted signal, the fixed frequency range delay in the echo signal may be the same as the fixed frequency range delay of the transmitted signal, which is ti. The lower portion of FIG. 6 illustrates the echo intermediate frequency signal and the interference intermediate frequency signal obtained after mixing the radar receiver, where the dashed line represents the echo intermediate frequency signal, the dotted horizontal line represents the interference intermediate frequency signal, f1 and f3 respectively represent the intermediate frequency signal frequency corresponding to the rising edge and falling edge of the trapezoidal modulation waveform of the echo signal, and f2 and f4 respectively represent the intermediate frequency signal frequency corresponding to the rising edge and falling edge of the trapezoidal modulation waveform of the interference signal.

The microwave radar anti-co-frequency interference method provided by the present disclosure is as follow.
(1) Set different fixed frequency delays in the trapezoidal modulation waveforms of multiple microwave radars.
(2) Extract the frequency point of the intermediate frequency signal corresponding to the target signal after processing the intermediate frequency signal of the microwave radar, the rising edge part including f1 and f3, and the falling edge part including f2 and f4.
(3) Since transmission signal of the microwave radar itself may have the same fixed frequency delay as the echo signal, therefore, f1=f3, and the fixed frequency delay of the interference microwave radar signal may be different from that of the microwave radar signal itself, therefore, f2≠f4. Therefore, f1 and f3 may be determined as the effective targets (that is, the signals corresponding to f1 and f3 are echo signals), and when the frequency difference between f4 and f2 is greater than or equal to the predetermined threshold, the signals corresponding to f2 and f4 may be determined as the interference signals.

(4) The fixed frequency delay value of the transmitted signal of different microwave radars may adopt the following setting rules:

$$|t1 - t2| \geq \frac{2 \times F_{max}}{CSR} \quad (1)$$

where t1 represents the fixed frequency range delay of the transmitted signal of the microwave radar itself, t2 represents the fixed frequency range delay of the transmitted signal of other microwave radars, $F_{max}$ represents the maximum effective bandwidth of the filter of the microwave radar itself, and CSR represents the slope of the frequency rising part or the frequency falling part.

The reason why it is needed to set the fixed frequency range delay between two microwave radars to be greater than a fixed value is to filter out the radar interference in a special situation as show in FIG. 7. In FIG. 7, the fixed frequency range delay of the transmission signal of the microwave radar itself is t1, the fixed frequency range delay of the interference signal is t2, and t2=2×t1. At this time f2=f4, and the interference signal cannot be filtered out by comparing the frequency points of the rising edge and the falling edge. However, when t1 and t2 satisfy Formula (1), f2=f4>$F_{max}$, therefore, the interference signal may be filtered out by the intermediate frequency filter of the radar receiver.

In some embodiments, determining the signal frequency of the intermediate frequency signal and the change information of the signal amplitude based on the intermediate frequency signal, and determining whether the received signal is an interference signal based on the change information of the signal frequency and the signal amplitude of the intermediate frequency signal.

In some embodiments, determining whether the received signal is an interference signal based on the change information of the signal frequency and the signal amplitude of the intermediate frequency signal may include determining the received signal is an interference signal if the change state of the signal frequency of the received signal is gradually decreasing and then gradually increasing, and the change state of the signal amplitude is gradually increasing and then gradually decreasing.

In some embodiments, determining whether the received signal is an interference signal based on the change information of the signal frequency and the signal amplitude of the intermediate frequency signal may include obtaining the signal amplitude information of N sampling points of the intermediate frequency signal; selecting P extreme value points based on the signal amplitude information of N sampling points, where P is a positive integer greater than or equal to two and less than N; and determining whether the received signal is an interference signal based on the index values of the P extreme points.

It should be noted that, at this time, the method can be used to obtain the first constant frequency of the intermediate frequency signal corresponding to the frequency rising part of the received signal and the second constant frequency of the intermediate frequency signal corresponding to the frequency falling part of the received signal, and calculate the frequency difference between the first constant frequency and the second constant frequency. When the frequency difference is greater than or equal to the predetermined threshold, the received signal may be determined as the interference signal of the microwave transmission signal. When the frequency difference is less than the predetermined threshold, the received signal may be determined as the echo signal of the microwave transmission signal, which may also exist at the same time.

In some embodiments, selecting P extreme value points based on the signal amplitude information of N sampling points may include, based on the amplitude information of N sampling points of the intermediate frequency signal, determining a maximum amplitude point and a minimum amplitude point in the N sampling points, calculating the amplitude difference between the maximum amplitude point and the minimum amplitude point, and recording the amplitude difference as a first difference; obtaining P extreme value points whose amplitude difference with the adjacent extreme value point is greater than A/2 from the N sampling points; and recording the index value of each extreme point in P extreme value points, and obtaining the P index values, where P is a positive integer greater than or equal to two and less than N.

In some embodiments, determining whether the received signal is an interference signal based on the index values of the P extreme points may include determining whether there are at least two target index values satisfying a predetermined time domain characteristic conditions in the P index values; and determining that the received signal is a burst interference signal in a time period corresponding to a fluctuation frequency after determining there are at least two target index values satisfying the predetermined time domain characteristic conditions in the P index values.

In some embodiments, obtaining P extreme value points whose amplitude difference with the adjacent extreme value point is greater than A/2 from the N sampling points may include obtaining all extreme points in the N sampling points, calculating the amplitude difference between every two adjacent extreme points, and recording the amplitude of the extreme point whose amplitude difference is greater than a predetermined difference and the index value of the extreme point whose amplitude difference is greater than the predetermined difference as a first set; calculating the absolute value of the amplitude difference of every two adjacent extreme points in the first set and the index value difference of every two adjacent extreme points in the first set, and recording the absolute value of the amplitude difference and the absolute value of the index value as a second set; and obtaining the extreme point where the absolute value of the amplitude difference in the second set is greater than A/2, and obtaining the first P extreme value points in a descending order of the absolute value of the amplitude difference.

In some embodiments, determining whether there are at least two target index values satisfying a predetermined time domain characteristic conditions in the P index values may include combining P index values in pairs, using the smaller index value of the combined two index values as a left boundary index value, and using the larger index value of the combined two index values as a right boundary index value; for each combination, calculating an index value difference between the right boundary index value and the left boundary index value, selecting M1 extreme points forward from the left boundary index value based on the order of the distance between the index value and the left boundary index value from small to large, selecting M2 extreme points backward from the right boundary index value based on the order of the distance between the index value and the right boundary index value from small to large, where M1 and M2 may both be positive integers; determining whether the index value difference between the right boundary index value and the left boundary index value satisfies a first predetermined time domain characteristic condition, and determining whether the M1 extreme value points and the M2 extreme value points satisfy a second predetermined time domain characteristic condition; using the two index values as two target index values when the index value difference between the right boundary index value and the left boundary index value satisfies the first predetermined time domain characteristic condition, and when the M1 extreme characteristic condition. The first predetermined time domain characteristic condition may be that the index value difference between the right boundary index value and the left boundary index value is less than a first predetermined interval value. The second predetermined time domain characteristic condition may include the index value difference of the M1 extreme points being less than a second predetermined interval value, and the index value difference of the M2 extreme points being less than the second predetermined interval value. The absolute mean value of the amplitude difference of the M1 extreme points may be less than half of the maximum absolute value of the amplitude difference in the second set, and the absolute mean value of the amplitude difference of the M2 extreme points may be less than half of the maximum absolute value of the amplitude difference in the second set.

In some embodiments, eliminating the interference signal may include using a middle position of the two target index values as a center index value when the target index value satisfying the predetermined time domain characteristic condition is two; when the target index value satisfying the predetermined time domain characteristic condition is greater than two, in all the combinations satisfying the condition, selecting the combination with the largest absolute value of the amplitude difference corresponding to the extreme point as the target index value combination, and using the middle position of the two target index values corresponding to the target index value combination as the center index value (for example, the middle position of the absolute value of the amplitude difference of the M1 extreme points and the absolute value of the amplitude difference of the M2 extreme points in all combinations corresponding to the largest absolute value may be used as the center index value); extending a predetermined sampling point length divided by 2 sampling points forward and backward respectively with the center index value as the center, and using the extended period of time as the burst interference part; and setting the amplitude of all sampling points in the burst interference part to an average value of the amplitudes of the N sampling points.

In some embodiments, the index value, target index value, left boundary index value, right boundary index value, and center index value may all be points in time, and the index value difference may be a difference between points in time.

When there is no fixed delay relationship between the two microwave radars transmission signals, some interference signals with a frequency lower than the maximum effective receiving frequency of the intermediate frequency filter may enter the system. Since the frequency of this part of the interference signal is within the effective signal bandwidth of the microwave radar, it cannot be filtered out from the frequency domain. Therefore, the present disclosure proposes to perform a feature extraction on the signal in the time domain to identify the interference signal part and perform interference cancellation compensation. As shown in FIG. 8, when the modulation waveform between two microwave radars has the above relationship, an intermediate frequency interference signal with a frequency less than f1 may be generated. f1 may be less than the maximum receiving frequency f_max of the intermediate frequency filter of the radar receiver, such that the intermediate frequency filter cannot filter out the interference signal.

The schematic diagram of the time domain signal corresponding to the interference signal of a segment AB in FIG. 8 is shown in FIG. 9. The area within the dashed lines in FIG. 9 is the interference signal part of the segment AB in FIG. 8. Because its shape is similar to a burst signal, it is referred to as a burst interference signal. By observing this signal, it is found that the signal frequency of the signal gradually decreases and then gradually increases, while the signal amplitude gradually increases then gradually decreases, which is the characteristic of the burst signal.

A method for identifying and eliminating the burst interference signal in the present disclosure will be described below. In the present disclosure, it is assumed that a group of radar intermediate frequency signals contains N sampling points. As shown in FIG. 10, the burst interference part is divided into a middle segment, a left extreme value segment, and a right extreme value segment, and feature extraction is performed respectively. Only when the three characteristics are satisfied at the same can an interference be considered as a burst interference. The specific implementation process of this method is shown in FIG. 11, which will be described in detail below.

1, searching for a maximum value and a minimum value of N sampling points, and recording their amplitude difference as amplitude Ampt_max; and calculating a mean value of the amplitude of N sampling points and recording it as Ampt_mean.

2, searching all extreme points in N sampling points, and recording the amplitude of these extreme points and their positions in the N sampling points (that is, the index value).

3, identifying all extreme points whose difference between two adjacent extreme points is greater than Ampt_extre from the extreme points obtained in the process at 2, recording the amplitude of these extreme points and their index values, and recording them as a set S_extre. Ampt_extre represents a reference extreme value difference. The Ampt_extre can be set and adjusted based on the specific situation, the main purpose is to filter out some extreme points with very small change.

4, obtaining an absolute value of the amplitude difference of all adjacent extreme points in the set S_extre and an absolute value of the index difference of the index value of all adjacent extreme points, and recording them as a set S_extre_delta.

5, identifying all extreme points whose absolute value of the amplitude difference between adjacent extreme points in the set S_extre_delta may be greater than Ampt_max/2, extracting four extreme points with the largest absolute value of the amplitude difference (where there are less than four, an actual number shall prevail), and recording the index values of the four extreme points as a set S_extre_index.

6, combining the index values in S_extre_index in pairs, and performing the processes at 7 to 9 respectively.

7, selecting two index values from S_extra_index and using the smaller value as the left boundary of the middle segment, and the larger value as the right boundary, and calculating their difference to see if the difference is less than C_index_mid, where C_index_mid represents the index spacing value of a predetermined middle segment, and this value can be set based on the specific situation.

8, from the left boundary of the middle segment to the left (forward in time), selecting the amplitude difference of M extreme points closest to the left boundary of the middle segment from S_extra_delta, and determining whether these extreme values satisfy the following characteristic conditions.

(1) Determine whether the index difference of these extreme points is less than C_index_edge, where C_index_edge represents the index spacing value of a predetermined left (2) Calculate a mean_edge of the absolute value of the amplitude difference of the M extreme points, extract the maximum value extre_delta_max of the absolute vale of the amplitude difference of the extreme points in S_extra_delta, and determine whether the mean_edge is less than extra_delta_max/2.

9, using the method at 8 to calculate whether the right extreme value small segment satisfies the characteristic conditions.

10, the two index values satisfying the characteristic conditions in the processes at 7 to 9 at the same time may be the target index values to be identified. When more than one set of target index values satisfy the conditions, the ground with the largest value of the extreme point amplitude difference may be selected as the target index value to be identified.

11, using the middle position of a set of target index values obtained in the process at 10 as the center position of the burst interference.

12, extending the center position of the burst interference obtained in the process at 11 to the left and right by band/2 sampling points as the burst interference segment, the band representing the sampling point length of the predetermined burst interference segment.

13, modifying all the sample values of the points in the burst interference segment to Ampt_mean, which means that the burst interference elimination of N sampling points is completed.

After the interference signal is eliminated, the position of the obstacle may be determined based on the echo signal of the microwave transmission signal after eliminating the interference signal, and the flight state or the flight trajectory of the UAV may be controlled based on the position of the obstacle, such as controlling the UAV to stop flying at the position of the obstacle (e.g., hovering at a certain height position) or fly around the obstacle.

A fifth embodiment of the present disclosure provides a computer storage medium. The computer storage medium stores program instructions, and the program instructions can be used to control the antenna device of the microwave radar to transmit microwave signals and/or obtain received signals, both the microwave transmitting signal and the receiving signal can be trapezoidal modulation waveforms, and one cycle of the trapezoidal modulation waveforms including a frequency rising part (rising edge), a frequency falling part (falling edge), and a fixed frequency part; and, obtain the intermediate frequency signal mixed by the frequency of the microwave transmission signal and the received signal, and determining whether the received signal is an interference signal based on the intermediate frequency signal.

In some embodiments, the computer storage medium may include a volatile storage device or a non-volatile storage device. The computer storage medium may also be a serial storage device or a parallel storage device. The computer storage medium may also be a RAM storage device or a ROM storage device.

In some embodiments, the program instructions determining whether the received signal is an interference signal based on the intermediate frequency signal may include determining a first constant frequency of the intermediate frequency signal corresponding to the frequency rising part of the received signal and a second constant frequency of the intermediate frequency signal corresponding to the frequency falling part of the received signal based on the intermediate frequency signal; and, determining whether the received is an interference signal based on the first constant frequency and the second constant frequency.

In some embodiments, the program instructions determining whether the received is an interference signal based on the first constant frequency and the second constant frequency may include calculating a frequency difference between the first constant frequency and the second constant frequency and determining whether the received signal is an interference signal based on a magnitude relationship between the frequency difference and a predetermined threshold.

In some embodiments, the program instructions determining whether the received signal is an interference signal based on the magnitude relationship between the frequency difference and the predetermined threshold may include determining that the received signal is an interference signal when the frequency difference is greater than or equal to the predetermined threshold; and, determining that the received signal is an echo signal of the microwave transmission signal when the frequency difference is less than the predetermined threshold.

In some embodiments, the program instructions may be further used to set the delay of the fixed frequency range of the microwave transmission signal and the delay of the fixed frequency range of the microwave transmission signal of other microwave radars to be greater than a predetermined value. For example, a delay t1 of the fixed frequency range of the microwave transmission signal and a delay t2 of the fixed frequency range of the microwave transmission signal of other microwave radars may be set to satisfy a predetermined relationship of $$|t1 - t2| \geq \frac{2 \times F_{max}}{CSR},$$

where $F_{max}$ is the maximum effective bandwidth of the microwave radar filter, and CSR is the slope of the frequency rising part or the frequency falling part.

The program instructions in the computer storage medium provided in the present disclosure can control the antenna device of the microwave radar to transmit the microwave transmission signal of the trapezoidal modulation waveform and receive the received signal of the trapezoidal modulation waveform, and the trapezoidal modulation waveform may be different from the triangular waveform in the related technology. That is, the trapezoidal modulation waveform can be generated by adding a fixed frequency delay for a certain period of time at the transition between the rising and falling edges of the triangular wave. Further, the program instructions can obtain an intermediate frequency signal that may be a mixture of the frequency microwave transmission signal and the received signal, compare the frequency difference between the first constant frequency of the intermediate frequency signal corresponding to the frequency rising part of the received signal and the second constant frequency of the intermediate frequency signal corresponding to the frequency falling part of the received with the predetermined threshold, and determine whether the received signal is an interference signal, that is, the received signal is another microwave radar, of the microwave transmission signal based on the comparison result. By using the technical solutions of the present disclosure, there is no need to artificially strictly control the signal transmission time of each microwave radar. That is, there is no need to perform time synchronization of multiple microwave radars, which is simpler and more convenient, and has wider applications.

In some embodiments, the program instructions may also be used to eliminate the interference signal after determining that the received signal is an interference signal.

The principle of the method of using trapezoidal modulation waveform to resist the same frequency interference of microwave radar is shown in FIG. 6. The upper portion of the FIG. 6 includes a transmitted signal (microwave transmission signal), an echo signal (the reflected signal of the transmitted signal), and an interference signal of the trapezoidal modulation waveform represented by the solid line, the dashed line, and the dotted horizontal line, respectively. Different microwave radars may have different delays in fixed frequency bands in the trapezoidal modulation waveforms. In the upper portion of FIG. 6, it is assumed that the delay of the fixed frequency part in the transmitted signal of the target microwave radar is ti, and the delay of the fixed frequency part in the interference signal of the received interference radar is tj. Since the echo signal is the signal received by the reflection of the transmitted signal, the fixed frequency range delay in the echo signal may be the same as the fixed frequency range delay of the transmitted signal, which is ti. The lower portion of FIG. 6 illustrates the echo intermediate frequency signal and the interference intermediate frequency signal obtained after mixing the radar receiver, where the dashed line represents the echo intermediate frequency signal, the dotted horizontal line represents the interference intermediate frequency signal, f1 and f3 respectively represent the intermediate frequency signal frequency corresponding to the rising edge and falling edge of the trapezoidal modulation waveform of the echo signal, and f2 and f4 respectively represent the intermediate frequency signal frequency corresponding to the rising edge and falling edge of the trapezoidal modulation waveform of the interference signal.

The microwave radar anti-co-frequency interference method provided by the present disclosure is as follow.

(1) Set different fixed frequency delays in the trapezoidal modulation waveforms of multiple microwave radars.
(2) Extract the frequency point of the intermediate frequency signal corresponding to the target signal after processing the intermediate frequency signal of the microwave radar, the rising edge part including f1 and f3, and the falling edge part including f2 and f4.
(3) Since transmission signal of the microwave radar itself may have the same fixed frequency delay as the echo signal, therefore, f1=f3, and the fixed frequency delay of the interference microwave radar signal may be different from that of the microwave radar signal itself, therefore, f2≠f4. Therefore, f1 and f3 may be determined as the effective targets (that is, the signals corresponding to f1 and f3 are echo signals), and when the frequency difference between f4 and f2 is greater than or equal to the predetermined threshold, the signals corresponding to f2 and f4 may be determined as the interference signals.
(4) The fixed frequency delay value of the transmitted signal of different microwave radars may adopt the following setting rules:

$$|t1 - t2| \geq \frac{2 \times F_{max}}{CSR} \quad (1)$$

where t1 represents the fixed frequency range delay of the transmitted signal of the microwave radar itself, t2 represents the fixed frequency range delay of the transmitted signal of other microwave radars, $F_{max}$ represents the maximum effective bandwidth of the filter of the microwave radar itself, and CSR represents the slope of the frequency rising part or the frequency falling part.

The reason why it is needed to set the fixed frequency range delay between two microwave radars to be greater than a fixed value is to filter out the radar interference in a special situation as show in FIG. 7. In FIG. 7, the fixed frequency range delay of the transmission signal of the microwave radar itself is t1, the fixed frequency range delay of the interference signal is t2, and t2=2×t1. At this time f2=f4, and the interference signal cannot be filtered out by comparing the frequency points of the rising edge and the falling edge. However, when t1 and t2 satisfy Formula (1), f2=f4>$F_{max}$, therefore, the interference signal may be filtered out by the intermediate frequency filter of the radar receiver.

In some embodiments, the program instructions may also be used to determine the signal frequency of the intermediate frequency signal and the change information of the signal amplitude based on the intermediate frequency signal, and determining whether the received signal is an interference signal based on the change information of the signal frequency and the signal amplitude of the intermediate frequency signal.

In some embodiments, the program instructions determining whether the received signal is an interference signal based on the change information of the signal frequency and the signal amplitude of the intermediate frequency signal may include determining the received signal is an interference signal if the change state of the signal frequency of the received signal is gradually decreasing and then gradually increasing, and the change state of the signal amplitude is gradually increasing and then gradually decreasing.

In some embodiments, the program instructions determining whether the received signal is an interference signal based on the change information of the signal frequency and the signal amplitude of the intermediate frequency signal may include obtaining the signal amplitude information of N sampling points of the intermediate frequency signal; selecting P extreme value points based on the signal amplitude information of N sampling points, where P is a positive integer greater than or equal to two and less than N; and determining whether the received signal is an interference signal based on the index values of the P extreme points.

It should be noted that, at this time, the method can be used to obtain the first constant frequency of the intermediate frequency signal corresponding to the frequency rising part of the received signal and the second constant frequency of the intermediate frequency signal corresponding to the frequency falling part of the received signal, and calculate the frequency difference between the first constant frequency and the second constant frequency. When the frequency difference is greater than or equal to the predetermined threshold, the received signal may be determined as the interference signal of the microwave transmission signal. When the frequency difference is less than the predetermined threshold, the received signal may be determined as the echo signal of the microwave transmission signal, which may also exist at the same time.

In some embodiments, the program instructions selecting P extreme value points based on the signal amplitude information of N sampling points may include, based on the amplitude information of N sampling points of the intermediate frequency signal, determining a maximum amplitude point and a minimum amplitude point in the N sampling points, calculating the amplitude difference between the maximum amplitude point and the minimum amplitude point, and recording the amplitude difference as a first difference; obtaining P extreme value points whose amplitude difference with the adjacent extreme value point is greater than A/2 from the N sampling points; and recording the index value of each extreme point in P extreme value points, and obtaining the P index values, where P is a positive integer greater than or equal to two and less than N.

In some embodiments, the program instructions determining whether the received signal is an interference signal based on the index values of the P extreme points may include determining whether there are at least two target index values satisfying a predetermined time domain characteristic conditions in the P index values; and determining that the received signal is a burst interference signal in a time period corresponding to a fluctuation frequency after determining there are at least two target index values satisfying the predetermined time domain characteristic conditions in the P index values.

In some embodiments, the program instructions obtaining P extreme value points whose amplitude difference with the adjacent extreme value point is greater than A/2 from the N sampling points may include obtaining all extreme points in the N sampling points, calculating the amplitude difference between every two adjacent extreme points, and recording the amplitude of the extreme point whose amplitude difference is greater than a predetermined difference and the index value of the extreme point whose amplitude difference is greater than the predetermined difference as a first set; calculating the absolute value of the amplitude difference of every two adjacent extreme points in the first set and the index value difference of every two adjacent extreme points in the first set, and recording the absolute value of the amplitude difference and the absolute value of the index value as a second set; and obtaining the extreme point where the absolute value of the amplitude difference in the second set is greater than A/2, and obtaining the first P extreme value points in a descending order of the absolute value of the amplitude difference.

In some embodiments, the program instructions determining whether there are at least two target index values satisfying a predetermined time domain characteristic conditions in the P index values may include combining P index values in pairs, using the smaller index value of the combined two index values as a left boundary index value, and using the larger index value of the combined two index values as a right boundary index value; for each combination, calculating an index value difference between the right boundary index value and the left boundary index value, selecting M1 extreme points forward from the left boundary index value based on the order of the distance between the index value and the left boundary index value from small to large, selecting M2 extreme points backward from the right boundary index value based on the order of the distance between the index value and the right boundary index value from small to large, where M1 and M2 may both be positive integers; determining whether the index value difference between the right boundary index value and the left boundary index value satisfies a first predetermined time domain characteristic condition, and determining whether the M1 extreme value points and the M2 extreme value points satisfy a second predetermined time domain characteristic condition; using the two index values as two target index values when the index value difference between the right boundary index value and the left boundary index value satisfies the first predetermined time domain characteristic condition, and when the M1 extreme value points and the M2 extreme value points satisfy the second predetermined time domain characteristic condition. The first predetermined time domain characteristic condition may be that the index value difference between the right boundary index value and the left boundary index value is less than a first predetermined interval value. The second predetermined time domain characteristic condition may include the index value difference of the M1 extreme points being less than a second predetermined interval value, and the index value difference of the M2 extreme points being less than the second predetermined interval value. The absolute mean value of the amplitude difference of the M1 extreme points may be less than half of the maximum absolute value of the amplitude difference in the second set, and the absolute mean value of the amplitude difference of the M2 extreme points may be less than half of the maximum absolute value of the amplitude difference in the second set.

In some embodiments, the program instructions eliminating the interference signal may include using a middle position of the two target index values as a center index value when the target index value satisfying the predetermined time domain characteristic condition is two; when the target index value satisfying the predetermined time domain characteristic condition is greater than two, in all the combinations satisfying the condition, selecting the combination with the largest absolute value of the amplitude difference corresponding to the extreme point as the target index value combination, and using the middle position of the two target index values corresponding to the target index value combination as the center index value (for example, the middle position of the absolute value of the amplitude difference of the M1 extreme points and the absolute value of the amplitude difference of the M2 extreme points in all combinations corresponding to the largest absolute value may be used as the center index value); extending a predetermined sampling point length divided by 2 sampling points forward and backward respectively with the center index value as the center, and using the extended period of time as the burst interference part; and setting the amplitude of all sampling points in the burst interference part to an average value of the amplitudes of the N sampling points.

In some embodiments, the index value, target index value, left boundary index value, right boundary index value, and center index value may all be points in time, and the index value difference may be a difference between points in time.

When there is no fixed delay relationship between the two microwave radars transmission signals, some interference signals with a frequency lower than the maximum effective receiving frequency of the intermediate frequency filter may enter the system. Since the frequency of this part of the interference signal is within the effective signal bandwidth of the microwave radar, it cannot be filtered out from the frequency domain. Therefore, the present disclosure proposes to perform a feature extraction on the signal in the time domain to identify the interference signal part and perform interference cancellation compensation. As shown in FIG. 8, when the modulation waveform between two microwave radars has the above relationship, an intermediate frequency interference signal with a frequency less than f1 may be generated. f1 may be less than the maximum receiving frequency f_max of the intermediate frequency filter of the radar receiver, such that the intermediate frequency filter cannot filter out the interference signal.

The schematic diagram of the time domain signal corresponding to the interference signal of a segment AB in FIG. 8 is shown in FIG. 9. The area within the dashed lines in FIG. 9 is the interference signal part of the segment AB in FIG. 8. Because its shape is similar to a burst signal, it is referred to as a burst interference signal. By observing this signal, it is found that the signal frequency of the signal gradually decreases and then gradually increases, while the signal amplitude gradually increases then gradually decreases, which is the characteristic of the burst signal.

A method for identifying and eliminating the burst interference signal in the present disclosure will be described below. In the present disclosure, it is assumed that a group of radar intermediate frequency signals contains N sampling points. As shown in FIG. 10, the burst interference part is divided into a middle segment, a left extreme value segment, and a right extreme value segment, and feature extraction is performed respectively. Only when the three characteristics are satisfied at the same can an interference be considered as a burst interference. The specific implementation process of this method is shown in FIG. 11, which will be described in detail below.

1, searching for a maximum value and a minimum value of N sampling points, and recording their amplitude difference as amplitude Ampt_max; and calculating a mean value of the amplitude of N sampling points and recording it as Ampt_mean.

2, searching all extreme points in N sampling points, and recording the amplitude of these extreme points and their positions in the N sampling points (that is, the index value).

3, identifying all extreme points whose difference between two adjacent extreme points is greater than Ampt_extre from the extreme points obtained in the process at 2, recording the amplitude of these extreme points and their index values, and recording them as a set S_extre. Ampt_extre represents a reference extreme value difference. The Ampt_extre can be set and adjusted based on the specific situation, the main purpose is to filter out some extreme points with very small change.

4, obtaining an absolute value of the amplitude difference of all adjacent extreme points in the set S_extre and an absolute value of the index difference of the index value of all adjacent extreme points, and recording them as a set S_extre_delta.

5, identifying all extreme points whose absolute value of the amplitude difference between adjacent extreme points in the set S_extre_delta may be greater than Ampt_max/2, extracting four extreme points with the largest absolute value of the amplitude difference (where there are less than four, an actual number shall prevail), and recording the index values of the four extreme points as a set S_extre_index.

6, combining the index values in S_extre_index in pairs, and performing the processes at 7 to 9 respectively.

7, selecting two index values from S_extra_index and using the smaller value as the left boundary of the middle segment, and the larger value as the right boundary, and calculating their difference to see if the difference is less than C_index_mid, where C_index_mid represents the index spacing value of a predetermined middle segment, and this value can be set based on the specific situation.

8, from the left boundary of the middle segment to the left (forward in time), selecting the amplitude difference of M extreme points closest to the left boundary of the middle segment from S_extra_delta, and determining whether these extreme values satisfy the following characteristic conditions.

(1) Determine whether the index difference of these extreme points is less than C_index_edge, where C_index_edge represents the index spacing value of a predetermined left (or right) extreme small segment.

(2) Calculate a mean_edge of the absolute value of the amplitude difference of the M extreme points, extract the maximum value extre_delta_max of the absolute vale of the amplitude difference of the extreme points in S_extra_delta, and determine whether the mean_edge is less than extra_delta_max/2.

9, using the method at 8 to calculate whether the right extreme value small segment satisfies the characteristic conditions.

10, the two index values satisfying the characteristic conditions in the processes at 7 to 9 at the same time may be the target index values to be identified. When more than one set of target index values satisfy the conditions, the ground with the largest value of the extreme point amplitude difference may be selected as the target index value to be identified.

11, using the middle position of a set of target index values obtained in the process at 10 as the center position of the burst interference.

12, extending the center position of the burst interference obtained in the process at 11 to the left and right by band/2 sampling points as the burst interference segment, the band representing the sampling point length of the predetermined burst interference segment.

13, modifying all the sample values of the points in the burst interference segment to Ampt_mean, which means that the burst interference elimination of N sampling points is completed.

Figure 16:
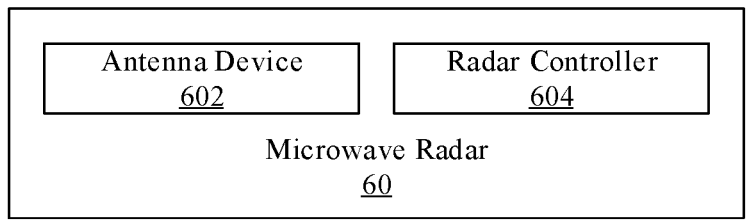
FIG. 16 is a schematic block diagram of a microwave radar according to an embodiment of the present disclosure.

A sixth embodiment of the present disclosure provides a microwave radar. FIG. 16 is a schematic block diagram of a microwave radar 60 according to an embodiment of the present disclosure. The microwave radar 60 includes an antenna device 602 used to transmit microwave signals and/or obtain received signals; and a radar controller 604 communicatively connected to the antenna device 602. The antenna device 602 transmits the intermediate frequency signal used to obtain the frequency of the microwave transmission signal and the mixed frequency of the received signal to the radar controller 604. The radar controller 604 determines the signal frequency and the signal amplitude change information of the intermediate frequency signal based on the intermediate frequency signal, and determines whether the received signal is an interference signal based on the change information of the signal frequency and signal amplitude of the intermediate frequency signal.

In some embodiments, the radar controller 604 determining whether the received signal is an interference signal based on the change information of the signal frequency and the signal amplitude of the intermediate frequency signal may include determining the received signal is an interference signal if the change state of the signal frequency of the received signal is gradually decreasing and then gradually increasing, and the change state of the signal amplitude is gradually increasing and then gradually decreasing.

The microwave radar 60 provided in the present disclosure includes an antenna device 602 and a radar controller 604. The radar controller 604 may be configured to control the antenna device 602 to transmit a microwave transmission signal and obtain a received signal. Further, the radar controller 604 may be configured to determine whether the change state of the frequency of the signal transmitted by the microwave is gradually decreasing and then gradually increasing, and whether the change state of the signal amplitude is gradually increasing and then gradually decreasing. If so, the received signal can be determined as the interference signal of the microwave transmission signal. By using the technical solution of the present disclosure, the part of the interference signal whose frequency is lower than the maximum receiving frequency f_max of the radar receiver filter can be identified.

In some embodiments, the microwave radar 60 may be disposed on a UAV. The radar controller 604 may include one or more microprocessors. The microwave radar 60 may further include a signal transmitter, a signal receiver, a filter, a mixer, and the like.

In some embodiments, the radar controller 604 determining whether the received signal is an interference signal based on the change information of the signal frequency and the signal amplitude of the intermediate frequency signal may include obtaining the signal amplitude information of N sampling points of the intermediate frequency signal; selecting P extreme value points based on the signal amplitude information of N sampling points, where P is a positive integer greater than or equal to two and less than N; and determining whether the received signal is an interference signal based on the index values of the P extreme points.

In some embodiments, the radar controller 604 may be further configured to eliminate the interference signal after determining that the received signal is an interference signal.

In some embodiments, the radar controller 604 selecting P extreme value points based on the signal amplitude information of N sampling points may include, based on the amplitude information of N sampling points of the intermediate frequency signal, determining a maximum amplitude point and a minimum amplitude point in the N sampling points, calculating the amplitude difference between the maximum amplitude point and the minimum amplitude point, and recording the amplitude difference as a first difference; obtaining P extreme value points whose amplitude difference with the adjacent extreme value point is greater than A/2 from the N sampling points; and recording the index value of each extreme point in P extreme value points, and obtaining the P index values, where P is a positive integer greater than or equal to two and less than N.

In some embodiments, the radar controller 604 determining whether the received signal is an interference signal based on the index values of the P extreme points may include determining whether there are at least two target index values satisfying a predetermined time domain characteristic conditions in the P index values; and determining that the received signal is a burst interference signal in a time period corresponding to a fluctuation frequency after determining there are at least two target index values satisfying the predetermined time domain characteristic conditions in the P index values.

In some embodiments, the radar controller 604 obtaining P extreme value points whose amplitude difference with the adjacent extreme value point is greater than A/2 from the N sampling points may include obtaining all extreme points in the N sampling points, calculating the amplitude difference between every two adjacent extreme points, and recording the amplitude of the extreme point whose amplitude difference is greater than a predetermined difference and the index value of the extreme point whose amplitude difference is greater than the predetermined difference as a first set; calculating the absolute value of the amplitude difference of every two adjacent extreme points in the first set and the index value difference of every two adjacent extreme points in the first set, and recording the absolute value of the amplitude difference and the absolute value of the index value as a second set; and obtaining the extreme point where the absolute value of the amplitude difference in the second set is greater than A/2, and obtaining the first P extreme value points in a descending order of the absolute value of the amplitude difference.

In some embodiments, the radar controller 604 determining whether there are at least two target index values satisfying a predetermined time domain characteristic conditions in the P index values may include combining P index values in pairs, using the smaller index value of the combined two index values as a left boundary index value, and using the larger index value of the combined two index values as a right boundary index value; for each combination, calculating an index value difference between the right boundary index value and the left boundary index value, selecting M1 extreme points forward from the left boundary index value based on the order of the distance between the index value and the left boundary index value from small to large, selecting M2 extreme points backward from the right boundary index value based on the order of the distance between the index value and the right boundary index value from small to large, where M1 and M2 may both be positive integers; determining whether the index value difference between the right boundary index value and the left boundary index value satisfies a first predetermined time domain characteristic condition, and determining whether the M1 extreme value points and the M2 extreme value points satisfy a second predetermined time domain characteristic condition; using the two index values as two target index values when the index value difference between the right boundary index value and the left boundary index value satisfies the first predetermined time domain characteristic condition, and when the M1 extreme value points and the M2 extreme value points satisfy the second predetermined time domain characteristic condition. The first predetermined time domain characteristic condition may be that the index value difference between the right boundary index value and the left boundary index value is less than a first predetermined interval value. The second predetermined time domain characteristic condition may include the index value difference of the M1 extreme points being less than a second predetermined interval value, and the index value difference of the M2 extreme points being less than the second predetermined interval value. The absolute mean value of the amplitude difference of the M1 extreme points may be less than half of the maximum absolute value of the amplitude difference in the second set, and the absolute mean value of the amplitude difference of the M2 extreme points may be less than half of the maximum absolute value of the amplitude difference in the second set.

In some embodiments, the radar controller 604 eliminating the interference signal may include using a middle position of the two target index values as a center index value when the target index value satisfying the predetermined time domain characteristic condition is two; when the target index value satisfying the predetermined time domain characteristic condition is greater than two, in all the combinations satisfying the condition, selecting the combination with the largest absolute value of the amplitude difference corresponding to the extreme point as the target index value combination, and using the middle position of the two target index values corresponding to the target index value combination as the center index value (for example, the middle position of the absolute value of the amplitude difference of the M1 extreme points and the absolute value of the amplitude difference of the M2 extreme points in all combinations corresponding to the largest absolute value may be used as the center index value); extending a predetermined sampling point length divided by 2 sampling points forward and backward respectively with the center index value as the center, and using the extended period of time as the burst interference part; and setting the amplitude of all sampling points in the burst interference part to an average value of the amplitudes of the N sampling points.

In some embodiments, the index value, target index value, left boundary index value, right boundary index value, and center index value may all be points in time, and the index value difference may be a difference between points in time.

When there is no fixed delay relationship between the two microwave radars transmission signals, some interference signals with a frequency lower than the maximum effective receiving frequency of the intermediate frequency filter may enter the system. Since the frequency of this part of the interference signal is within the effective signal bandwidth of the microwave radar, it cannot be filtered out from the frequency domain. Therefore, the present disclosure proposes to perform a feature extraction on the signal in the time domain to identify the interference signal part and perform interference cancellation compensation. As shown in FIG. 8, when the modulation waveform between two microwave radars has the above relationship, an intermediate frequency interference signal with a frequency less than f1 may be generated. f1 may be less than the maximum receiving frequency f_max of the intermediate frequency filter of the radar receiver, such that the intermediate frequency filter cannot filter out the interference signal.

The schematic diagram of the time domain signal corresponding to the interference signal of a segment AB in FIG. 8 is shown in FIG. 9. The area within the dashed lines in FIG. 9 is the interference signal part of the segment AB in FIG. 8. Because its shape is similar to a burst signal, it is referred to as a burst interference signal. By observing this signal, it is found that the signal frequency of the signal gradually decreases and then gradually increases, while the signal amplitude gradually increases then gradually decreases, which is the characteristic of the burst signal.

A method for identifying and eliminating the burst interference signal in the present disclosure will be described below. In the present disclosure, it is assumed that a group of radar intermediate frequency signals contains N sampling points. As shown in FIG. 10, the burst interference part is divided into a middle segment, a left extreme value segment, and a right extreme value segment, and feature extraction is performed respectively. Only when the three characteristics are satisfied at the same can an interference be considered as a burst interference. The specific implementation process of this method is shown in FIG. 11, which will be described in detail below.

1, searching for a maximum value and a minimum value of N sampling points, and recording their amplitude difference as amplitude Ampt_max; and calculating a mean value of the amplitude of N sampling points and recording it as Ampt_mean.

2, searching all extreme points in N sampling points, and recording the amplitude of these extreme points and their positions in the N sampling points (that is, the index value).

3, identifying all extreme points whose difference between two adjacent extreme points is greater than Ampt_extre from the extreme points obtained in the process at 2, recording the amplitude of these extreme points and their index values, and recording them as a set S_extre. Ampt_extre represents a reference extreme value difference. The Ampt_extre can be set and adjusted based on the specific situation, the main purpose is to filter out some extreme points with very small change.

4, obtaining an absolute value of the amplitude difference of all adjacent extreme points in the set S_extre and an absolute value of the index difference of the index value of all adjacent extreme points, and recording them as a set S_extre_delta.

5, identifying all extreme points whose absolute value of the amplitude difference between adjacent extreme points in the set S_extre_delta may be greater than Ampt_max/2, extracting four extreme points with the largest absolute value of the amplitude difference (where there are less than four, an actual number shall prevail), and recording the index values of the four extreme points as a set S_extre_index.

6, combining the index values in S_extre_index in pairs, and performing the processes at 7 to 9 respectively.

7, selecting two index values from S_extra_index and using the smaller value as the left boundary of the middle segment, and the larger value as the right boundary, and calculating their difference to see if the difference is less than C_index_mid, where C_index_mid represents the index spacing value of a predetermined middle segment, and this value can be set based on the specific situation.

8, from the left boundary of the middle segment to the left (forward in time), selecting the amplitude difference of M extreme points closest to the left boundary of the middle segment from S_extra_delta, and determining whether these extreme values satisfy the following characteristic conditions.

(1) Determine whether the index difference of these extreme points is less than C_index_edge, where C_index_edge represents the index spacing value of a predetermined left (or right) extreme small segment.

(2) Calculate a mean_edge of the absolute value of the amplitude difference of the M extreme points, extract the maximum value extre_delta_max of the absolute vale of the amplitude difference of the extreme points in S_extra_delta, and determine whether the mean_edge is less than extra_delta_max/2.

9, using the method at 8 to calculate whether the right extreme value small segment satisfies the characteristic conditions.

10, the two index values satisfying the characteristic conditions in the processes at 7 to 9 at the same time may be the target index values to be identified. When more than one set of target index values satisfy the conditions, the ground with the largest value of the extreme point amplitude difference may be selected as the target index value to be identified.

11, using the middle position of a set of target index values obtained in the process at 10 as the center position of the burst interference.

12, extending the center position of the burst interference obtained in the process at 11 to the left and right by band/2 sampling points as the burst interference segment, the band representing the sampling point length of the predetermined burst interference segment.

13, modifying all the sample values of the points in the burst interference segment to Ampt_mean, which means that the burst interference elimination of N sampling points is completed.

Figure 17:
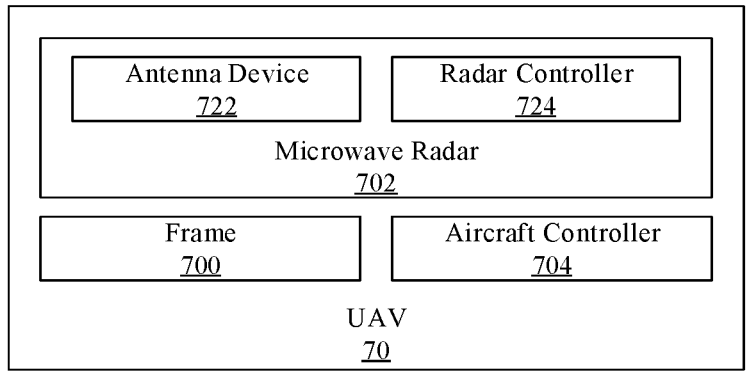
FIG. 17 is a schematic block diagram of the UAV according to an embodiment of the present disclosure.

A seventh embodiment of the present disclosure provides a UAV. FIG. 17 is a schematic block diagram of a UAV 70 according to an embodiment of the present disclosure. The UAV 70 includes a frame 700; a microwave radar 702 disposed on the frame 700. The microwave radar 702 includes an antenna device 722 configured to transmit microwave signals and/or obtain received signals; and a radar controller 724 in communication connection with the antenna device 722, where the antenna device 722 may be configured to send the intermediate frequency signal mixed by the frequency of the microwave transmission signal and the received signal to the radar controller 724. The radar controller 724 may be configured to determine the change information of the signal frequency and the signal amplitude of the intermediate frequency signal based on the intermediate frequency signal, and determine whether received signal is an interference signal based on the change information of the signal frequency and the signal amplitude of the intermediate frequency signal.

The UAV 70 may further includes an aircraft controller 704. When the radar controller 724 determines that the received signal is not an interference signal, the aircraft controller 704 may determine the coordinate information of a detection target corresponding to the received signal, and update the UAV's trajectory based on the coordinate information of the detection target.

In some embodiments, the radar controller 724 determining whether the received signal is an interference signal based on the change information of the signal frequency and the signal amplitude of the intermediate frequency signal may include determining the received signal is an interference signal if the change state of the signal frequency of the received signal is gradually decreasing and then gradually increasing, and the change state of the signal amplitude is gradually increasing and then gradually decreasing.

The UAV 70 provided in the present disclosure includes a frame 700, a microwave radar 702, and an aircraft controller 704. The microwave radar 702 includes an antenna device 722 and a radar controller 724. The radar controller 724 may be configured to control the antenna device 722 to transmit microwave transmission signals and obtain received signals. Further, the radar controller 724 may be configured to determine whether the change state of the frequency of the signal transmitted by the microwave is gradually decreasing and then gradually increasing, and whether the change state of the signal amplitude is gradually increasing and then gradually decreasing. If so, the received signal can be determined as the interference signal of the microwave transmission signal. When it is determined that the received signal is not an interference, the aircraft controller 704 can determined the coordinate information of the detection target corresponding to the received signal, and update the trajectory of the UAV based on the coordinate information of the detection target. By using the technical solution of the present disclosure, the part of the interference signal whose frequency is lower than the maximum receiving frequency f_max of the radar receiver filter can be identified.

In some embodiments, the microwave radar 702 may be disposed on the UAV 70. The radar controller 724 may include one or more microprocessors. The microwave radar 702 may further include a signal transmitter, a signal receiver, a filter, a mixer, and the like.

In some embodiments, the radar controller determining whether the received signal is an interference signal based on the change information of the signal frequency and the signal amplitude of the intermediate frequency signal may include obtaining the signal amplitude information of N sampling points of the intermediate frequency signal; selecting P extreme value points based on the signal amplitude information of N sampling points, where P is a positive integer greater than or equal to two and less than N; and determining whether the received signal is an interference signal based on the index values of the P extreme points.

In some embodiments, the radar controller 724 may be further configured to eliminate the interference signal after determining that the received signal is an interference signal.

In some embodiments, the radar controller 724 selecting P extreme value points based on the signal amplitude information of N sampling points may include, based on the amplitude information of N sampling points of the intermediate frequency signal, determining a maximum amplitude point and a minimum amplitude point in the N sampling points, calculating the amplitude difference between the maximum amplitude point and the minimum amplitude point, and recording the amplitude difference as a first difference; obtaining P extreme value points whose amplitude difference with the adjacent extreme value point is greater than A/2 from the N sampling points; and recording the index value of each extreme point in P extreme value points, and obtaining the P index values, where P is a positive integer greater than or equal to two and less than N.

In some embodiments, the radar controller 724 determining whether the received signal is an interference signal based on the index values of the P extreme points may include determining whether there are at least two target index values satisfying a predetermined time domain characteristic conditions in the P index values; and determining that the received signal is a burst interference signal in a time period corresponding to a fluctuation frequency after determining there are at least two target index values satisfying the predetermined time domain characteristic conditions in the P index values.

In some embodiments, the radar controller 724 obtaining P extreme value points whose amplitude difference with the adjacent extreme value point is greater than A/2 from the N sampling points may include obtaining all extreme points in the N sampling points, calculating the amplitude difference between every two adjacent extreme points, and recording the amplitude of the extreme point whose amplitude difference is greater than a predetermined difference and the index value of the extreme point whose amplitude difference is greater than the predetermined difference as a first set; calculating the absolute value of the amplitude difference of every two adjacent extreme points in the first set and the index value difference of every two adjacent extreme points in the first set, and recording the absolute value of the amplitude difference and the absolute value of the index value as a second set; and obtaining the extreme point where the absolute value of the amplitude difference in the second set is greater than A/2, and obtaining the first P extreme value points in a descending order of the absolute value of the amplitude difference.

In some embodiments, the radar controller 724 determining whether there are at least two target index values satisfying a predetermined time domain characteristic conditions in the P index values may include combining P index values in pairs, using the smaller index value of the combined two index values as a left boundary index value, and using the larger index value of the combined two index values as a right boundary index value; for each combination, calculating an index value difference between the right boundary index value and the left boundary index value, selecting M1 extreme points forward from the left boundary index value based on the order of the distance between the index value and the left boundary index value from small to large, selecting M2 extreme points backward from the right boundary index value based on the order of the distance between the index value and the right boundary index value from small to large, where M1 and M2 may both be positive integers; determining whether the index value difference between the right boundary index value and the left boundary index value satisfies a first predetermined time domain characteristic condition, and determining whether the M1 extreme value points and the M2 extreme value points satisfy a second predetermined time domain characteristic condition; using the two index values as two target index values when the index value difference between the right boundary index value and the left boundary index value satisfies the first predetermined time domain characteristic condition, and when the M1 extreme value points and the M2 extreme value points satisfy the second predetermined time domain characteristic condition. The first predetermined time domain characteristic condition may be that the index value difference between the right boundary index value and the left boundary index value is less than a first predetermined interval value. The second predetermined time domain characteristic condition may include the index value difference of the M1 extreme points being less than a second predetermined interval value, and the index value difference of the M2 extreme points being less than the second predetermined interval value. The absolute mean value of the amplitude difference of the M1 extreme points may be less than half of the maximum absolute value of the amplitude difference in the second set, and the absolute mean value of the amplitude difference of the M2 extreme points may be less than half of the maximum absolute value of the amplitude difference in the second set.

In some embodiments, the radar controller 724 eliminating the interference signal may include using a middle position of the two target index values as a center index value when the target index value satisfying the predetermined time domain characteristic condition is two; when the target index value satisfying the predetermined time domain characteristic condition is greater than two, in all the combinations satisfying the condition, selecting the combination with the largest absolute value of the amplitude difference corresponding to the extreme point as the target index value combination, and using the middle position of the two target index values corresponding to the target index value combination as the center index value (for example, the middle position of the absolute value of the amplitude difference of the M1 extreme points and the absolute value of the amplitude difference of the M2 extreme points in all combinations corresponding to the largest absolute value may be used as the center index value); extending a predetermined sampling point length divided by 2 sampling points forward and backward respectively with the center index value as the center, and using the extended period of time as the burst interference part; and setting the amplitude of all sampling points in the burst interference part to an average value of the amplitudes of the N sampling points.

In some embodiments, the index value, target index value, left boundary index value, right boundary index value, and center index value may all be points in time, and the index value difference may be a difference between points in time.

When there is no fixed delay relationship between the two microwave radars transmission signals, some interference signals with a frequency lower than the maximum effective receiving frequency of the intermediate frequency filter may enter the system. Since the frequency of this part of the interference signal is within the effective signal bandwidth of the microwave radar, it cannot be filtered out from the frequency domain. Therefore, the present disclosure proposes to perform a feature extraction on the signal in the time domain to identify the interference signal part and perform interference cancellation compensation. As shown in FIG. 8, when the modulation waveform between two microwave radars has the above relationship, an intermediate frequency interference signal with a frequency less than f1 may be generated. f1 may be less than the maximum receiving frequency f_max of the intermediate frequency filter of the radar receiver, such that the intermediate frequency filter cannot filter out the interference signal.

The schematic diagram of the time domain signal corresponding to the interference signal of a segment AB in FIG. 8 is shown in FIG. 9. The area within the dashed lines in FIG. 9 is the interference signal part of the segment AB in FIG. 8. Because its shape is similar to a burst signal, it is referred to as a burst interference signal. By observing this signal, it is found that the signal frequency of the signal gradually decreases and then gradually increases, while the signal amplitude gradually increases then gradually decreases, which is the characteristic of the burst signal.

A method for identifying and eliminating the burst interference signal in the present disclosure will be described below. In the present disclosure, it is assumed that a group of radar intermediate frequency signals contains N sampling points. As shown in FIG. 10, the burst interference part is divided into a middle segment, a left extreme value segment, and a right extreme value segment, and feature extraction is performed respectively. Only when the three characteristics are satisfied at the same can an interference be considered as a burst interference. The specific implementation process of this method is shown in FIG. 11, which will be described in detail below.

1, searching for a maximum value and a minimum value of N sampling points, and recording their amplitude difference as amplitude Ampt_max; and calculating a mean value of the amplitude of N sampling points and recording it as Ampt_mean.

2, searching all extreme points in N sampling points, and recording the amplitude of these extreme points and their positions in the N sampling points (that is, the index value).

3, identifying all extreme points whose difference between two adjacent extreme points is greater than Ampt_extre from the extreme points obtained in the process at 2, recording the amplitude of these extreme points and their index values, and recording them as a set S_extre. Ampt_extre represents a reference extreme value difference. The Ampt_extre can be set and adjusted based on the specific situation, the main purpose is to filter out some extreme points with very small change.

4, obtaining an absolute value of the amplitude difference of all adjacent extreme points in the set S_extre and an absolute value of the index difference of the index value of all 5, identifying all extreme points whose absolute value of the amplitude difference between adjacent extreme points in the set S_extre_delta may be greater than Ampt_max/2, extracting four extreme points with the largest absolute value of the amplitude difference (where there are less than four, an actual number shall prevail), and recording the index values of the four extreme points as a set S_extre_index.

6, combining the index values in S_extre_index in pairs, and performing the processes at 7 to 9 respectively.

7, selecting two index values from S_extra_index and using the smaller value as the left boundary of the middle segment, and the larger value as the right boundary, and calculating their difference to see if the difference is less than C_index_mid, where C_index_mid represents the index spacing value of a predetermined middle segment, and this value can be set based on the specific situation.

8, from the left boundary of the middle segment to the left (forward in time), selecting the amplitude difference of M extreme points closest to the left boundary of the middle segment from S_extra_delta, and determining whether these extreme values satisfy the following characteristic conditions.

(1) Determine whether the index difference of these extreme points is less than C_index_edge, where C_index_edge represents the index spacing value of a predetermined left (or right) extreme small segment.

(2) Calculate a mean_edge of the absolute value of the amplitude difference of the M extreme points, extract the maximum value extre_delta_max of the absolute vale of the amplitude difference of the extreme points in S_extra_delta, and determine whether the mean_edge is less than extra_delta_max/2.

9, using the method at 8 to calculate whether the right extreme value small segment satisfies the characteristic conditions.

10, the two index values satisfying the characteristic conditions in the processes at 7 to 9 at the same time may be the target index values to be identified. When more than one set 11, using the middle position of a set of target index values obtained in the process at 10 as the center position of the burst interference.

12, extending the center position of the burst interference obtained in the process at 11 to the left and right by band/2 sampling points as the burst interference segment, the band representing the sampling point length of the predetermined burst interference segment.

13, modifying all the sample values of the points in the burst interference segment to Ampt_mean, which means that the burst interference elimination of N sampling points is completed.

After eliminating the interference signal using the microwave radar anti-burst interference method, the aircraft controller of the UAV may determine the position of an obstacle based on the echo signal of the microwave transmission signal after the interference signal is eliminated, and control the flight state or the flight trajectory of the UAV based on the position of the obstacle, such as controlling the UAV to stop flying at the position of the obstacle (e.g., hovering at a certain height position) or fly around the obstacle.

Figure 18:
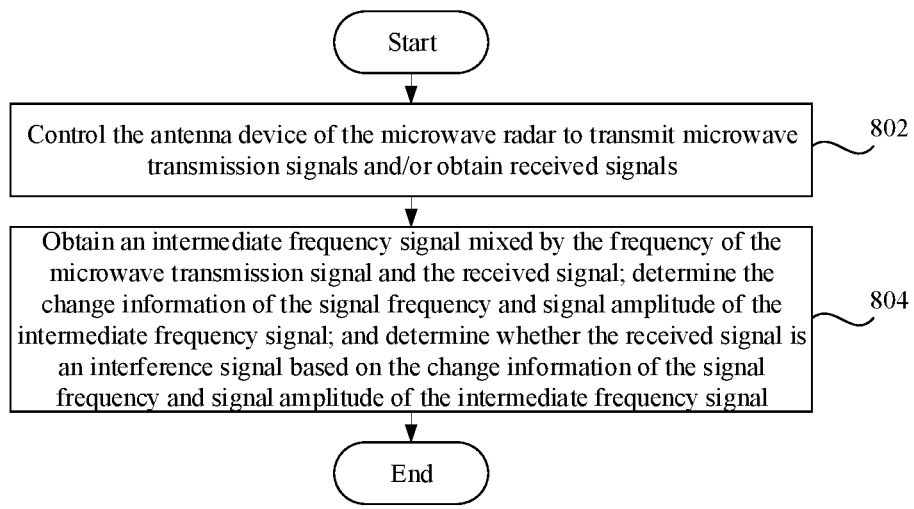
FIG. 18 is a flowchart of the microwave radar signal processing method according to an embodiment of the present disclosure.

An eighth aspect of the present disclosure provides a signal processing method for microwave radar. FIG. 18 is a flowchart of the microwave radar signal processing method according to an embodiment of the present disclosure. The method will be described in detail below.

802, controlling the antenna device of the microwave radar to transmit microwave transmission signals and/or obtain received signals.

804, obtaining an intermediate frequency signal mixed by the frequency of the microwave transmission signal and the received signal; determining the change information of the signal frequency and signal amplitude of the intermediate frequency signal; and determining whether the received signal is an interference signal based on the change information of the signal frequency and signal amplitude of the intermediate frequency signal.

In some embodiments, the process at 804 of determining whether the received signal is an interference signal based on the change information of the signal frequency and the signal amplitude of the intermediate frequency signal may include determining the received signal is an interference signal if the change state of the signal frequency of the received signal is gradually decreasing and then gradually increasing, and the change state of the signal amplitude is gradually increasing and then gradually decreasing.

The microwave radar signal processing method provided in the present disclosure can control the antenna device to transmit microwave transmission signals and obtain received signals. Further, an intermediate frequency signal mixed by the frequency of the microwave transmission signal and the received signal can be obtained, and whether the received signal is an interference can be determined by determining whether the change state of the frequency of the signal transmitted by the microwave is gradually decreasing and then gradually increasing, and whether the change state of the signal amplitude is gradually increasing and then gradually decreasing. If so, the received signal can be determined as the interference signal of the microwave transmission signal. By using the technical solution of the present disclosure, the part of the interference signal whose frequency is lower than the maximum receiving frequency f_max of the radar receiver filter can be identified.

In some embodiments, the process at 804 of determining whether the received signal is an interference signal based on the change information of the signal frequency and the signal amplitude of the intermediate frequency signal may include obtaining the signal amplitude information of N sampling points of the intermediate frequency signal; selecting P extreme value points based on the signal amplitude information of N sampling points, where P is a positive integer greater than or equal to two and less than N; and determining whether the received signal is an interference signal based on the index values of the P extreme points.

In some embodiments, the method may further include eliminating the interference signal after determining that the received signal is an interference signal.

In some embodiments, selecting P extreme value points based on the signal amplitude information of N sampling points may include, based on the amplitude information of N sampling points of the intermediate frequency signal, determining a maximum amplitude point and a minimum amplitude point in the N sampling points, calculating the amplitude difference between the maximum amplitude point and the minimum amplitude point, and recording the amplitude difference as a first difference; obtaining P extreme value points whose amplitude difference with the adjacent extreme value point is greater than A/2 from the N sampling points; and recording the index value of each extreme point in P extreme value points, and obtaining the P index values, where P is a positive integer greater than or equal to two and less than N.

In some embodiments, determining whether the received signal is an interference signal based on the index values of the P extreme points may include determining whether there are at least two target index values satisfying a predetermined time domain characteristic conditions in the P index values; and determining that the received signal is a burst interference signal in a time period corresponding to a fluctuation frequency after determining there are at least two target index values satisfying the predetermined time domain characteristic conditions in the P index values.

In some embodiments, obtaining P extreme value points whose amplitude difference with the adjacent extreme value point is greater than A/2 from the N sampling points may include obtaining all extreme points in the N sampling points, calculating the amplitude difference between every two adjacent extreme points, and recording the amplitude of the extreme point whose amplitude difference is greater than a predetermined difference and the index value of the extreme point whose amplitude difference is greater than the predetermined difference as a first set; calculating the absolute value of the amplitude difference of every two adjacent extreme points in the first set and the index value difference of every two adjacent extreme points in the first set, and recording the absolute value of the amplitude difference and the absolute value of the index value as a second set; and obtaining the extreme point where the absolute value of the amplitude difference in the second set is greater than A/2, and obtaining the first P extreme value points in a descending order of the absolute value of the amplitude difference.

In some embodiments, determining whether there are at least two target index values satisfying a predetermined time domain characteristic conditions in the P index values may include combining P index values in pairs, using the smaller index value of the combined two index values as a left boundary index value, and using the larger index value of the combined two index values as a right boundary index value; for each combination, calculating an index value difference between the right boundary index value and the left boundary index value, selecting M1 extreme points forward from the left boundary index value based on the order of the distance between the index value and the left boundary index value from small to large, selecting M2 extreme points backward from the right boundary index value based on the order of the distance between the index value and the right boundary index value from small to large, where M1 and M2 may both be positive integers; determining whether the index value difference between the right boundary index value and the left boundary index value satisfies a first predetermined time domain characteristic condition, and determining whether the M1 extreme value points and the M2 extreme value points satisfy a second predetermined time domain characteristic condition; using the two index values as two target index values when the index value difference between the right boundary index value and the left boundary index value satisfies the first predetermined time domain characteristic condition, and when the M1 extreme value points and the M2 extreme value points satisfy the second predetermined time domain characteristic condition. The first predetermined time domain characteristic condition may be that the index value difference between the right boundary index value and the left boundary index value is less than a first predetermined interval value. The second predetermined time domain characteristic condition may include the index value difference of the M1 extreme points being less than a second predetermined interval value, and the index value difference of the M2 extreme points being less than the second predetermined interval value. The absolute mean value of the amplitude difference of the M1 extreme points may be less than half of the maximum absolute value of the amplitude difference in the second set, and the absolute mean value of the amplitude difference of the M2 extreme points may be less than half of the maximum absolute value of the amplitude difference in the second set.

In some embodiments, eliminating the interference signal may include using a middle position of the two target index values as a center index value when the target index value satisfying the predetermined time domain characteristic condition is two; when the target index value satisfying the predetermined time domain characteristic condition is greater than two, in all the combinations satisfying the condition, selecting the combination with the largest absolute value of the amplitude difference corresponding to the extreme point as the target index value combination, and using the middle position of the two target index values corresponding to the target index value combination as the center index value (for example, the middle position of the absolute value of the amplitude difference of the M1 extreme points and the absolute value of the amplitude difference of the M2 extreme points in all combinations corresponding to the largest absolute value may be used as the center index value); extending a predetermined sampling point length divided by 2 sampling points forward and backward respectively with the center index value as the center, and using the extended period of time as the burst interference part; and setting the amplitude of all sampling points in the burst interference part to an average value of the amplitudes of the N sampling points.

In some embodiments, the index value, target index value, left boundary index value, right boundary index value, and center index value may all be points in time, and the index value difference may be a difference between points in time.

When there is no fixed delay relationship between the two microwave radars transmission signals, some interference signals with a frequency lower than the maximum effective receiving frequency of the intermediate frequency filter may enter the system. Since the frequency of this part of the interference signal is within the effective signal bandwidth of the microwave radar, it cannot be filtered out from the frequency domain. Therefore, the present disclosure proposes to perform a feature extraction on the signal in the time domain to identify the interference signal part and perform interference cancellation compensation. As shown in FIG. 8, when the modulation waveform between two microwave radars has the above relationship, an intermediate frequency interference signal with a frequency less than f1 may be generated. f1 may be less than the maximum receiving frequency f_max of the intermediate frequency filter of the radar receiver, such that the intermediate frequency filter cannot filter out the interference signal.

The schematic diagram of the time domain signal corresponding to the interference signal of a segment AB in FIG. 8 is shown in FIG. 9. The area within the dashed lines in FIG. 9 is the interference signal part of the segment AB in FIG. 8. Because its shape is similar to a burst signal, it is referred to as a burst interference signal. By observing this signal, it is found that the signal frequency of the signal gradually decreases and then gradually increases, while the signal amplitude gradually increases then gradually decreases, which is the characteristic of the burst signal.

A method for identifying and eliminating the burst interference signal in the present disclosure will be described below. In the present disclosure, it is assumed that a group of radar intermediate frequency signals contains N sampling points. As shown in FIG. 10, the burst interference part is divided into a middle segment, a left extreme value segment, and a right extreme value segment, and feature extraction is performed respectively. Only when the three characteristics are satisfied at the same can an interference be considered as a burst interference. The specific implementation process of this method is shown in FIG. 11, which will be described in detail below.

1, searching for a maximum value and a minimum value of N sampling points, and recording their amplitude difference as amplitude Ampt_max; and calculating a mean value of the amplitude of N sampling points and recording it as Ampt_mean.

2, searching all extreme points in N sampling points, and recording the amplitude of these extreme points and their positions in the N sampling points (that is, the index value).

3, identifying all extreme points whose difference between two adjacent extreme points is greater than Ampt_extre from the extreme points obtained in the process at 2, recording the amplitude of these extreme points and their index values, and recording them as a set S_extre. Ampt_extre represents a reference extreme value difference. The Ampt_extre can be set and adjusted based on the specific situation, the main purpose is to filter out some extreme points with very small change.

4, obtaining an absolute value of the amplitude difference of all adjacent extreme points in the set S_extre and an absolute value of the index difference of the index value of all adjacent extreme points, and recording them as a set S_extre_delta.

5, identifying all extreme points whose absolute value of the amplitude difference between adjacent extreme points in the set S_extre_delta may be greater than Ampt_max/2, extracting four extreme points with the largest absolute value of the amplitude difference (where there are less than four, an actual number shall prevail), and recording the index values of the four extreme points as a set S_extre_index.

6, combining the index values in S_extre_index in pairs, and performing the processes at 7 to 9 respectively.

7, selecting two index values from S_extra_index and using the smaller value as the left boundary of the middle segment, and the larger value as the right boundary, and calculating their difference to see if the difference is less than C_index_mid, where C_index_mid represents the index spacing value of a predetermined middle segment, and this value can be set based on the specific situation.

8, from the left boundary of the middle segment to the left (forward in time), selecting the amplitude difference of M extreme points closest to the left boundary of the middle segment from S_extra_delta, and determining whether these extreme values satisfy the following characteristic conditions.

(1) Determine whether the index difference of these extreme points is less than C_index_edge, where C_index_edge represents the index spacing value of a predetermined left (or right) extreme small segment.

(2) Calculate a mean_edge of the absolute value of the amplitude difference of the M extreme points, extract the maximum value extre_delta_max of the absolute vale of the amplitude difference of the extreme points in S_extra_delta, and determine whether the mean_edge is less than extra_delta_max/2.

9, using the method at 8 to calculate whether the right extreme value small segment satisfies the characteristic conditions.

10, the two index values satisfying the characteristic conditions in the processes at 7 to 9 at the same time may be the target index values to be identified. When more than one set of target index values satisfy the conditions, the ground with the largest value of the extreme point amplitude difference may be selected as the target index value to be identified.

11, using the middle position of a set of target index values obtained in the process at 10 as the center position of the burst interference.

12, extending the center position of the burst interference obtained in the process at 11 to the left and right by band/2 sampling points as the burst interference segment, the band representing the sampling point length of the predetermined burst interference segment.

13, modifying all the sample values of the points in the burst interference segment to Ampt_mean, which means that the burst interference elimination of N sampling points is completed.

Figure 19:
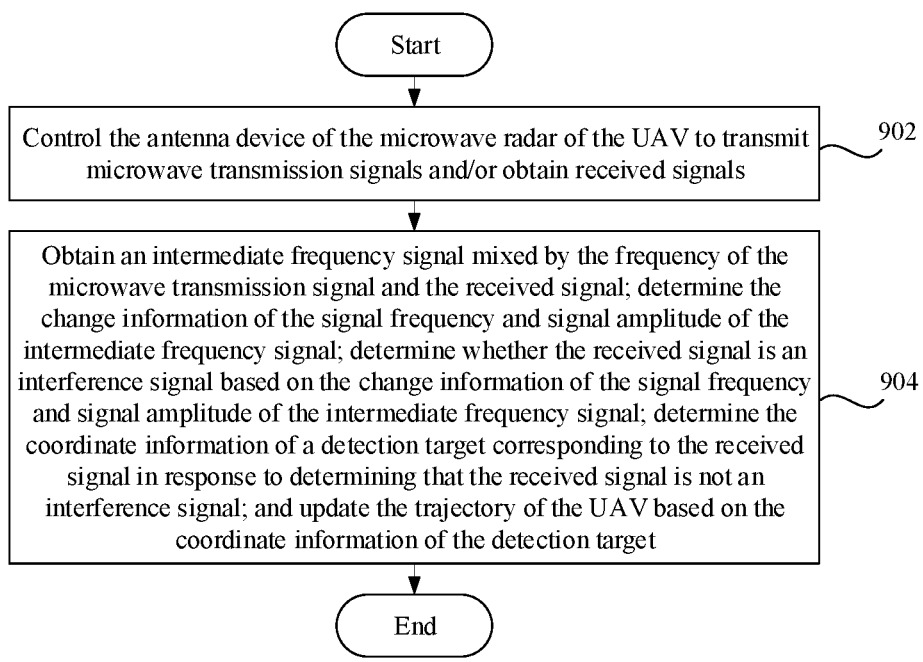
FIG. 19 is a flowchart of the UAV control method according to an embodiment of the present disclosure.

A ninth aspect of the present disclosure provides a UAV control method. FIG. 19 is a flowchart of the UAV control method according to an embodiment of the present disclosure. The method will be described in detail below.

902, controlling the antenna device of the microwave radar of the UAV to transmit microwave transmission signals and/or obtain received signals.

904, obtaining an intermediate frequency signal mixed by the frequency of the microwave transmission signal and the received signal; determining the change information of the signal frequency and signal amplitude of the intermediate frequency signal; determining whether the received signal is an interference signal based on the change information of the signal frequency and signal amplitude of the intermediate frequency signal; determining the coordinate information of a detection target corresponding to the received signal in response to determining that the received signal is not an interference signal; and updating the trajectory of the UAV based on the coordinate information of the detection target.

In some embodiments, the process at 904 of determining whether the received signal is an interference signal based on the change information of the signal frequency and the signal amplitude of the intermediate frequency signal may include determining the received signal is an interference signal if the change state of the signal frequency of the received signal is gradually decreasing and then gradually increasing, and the change state of the signal amplitude is gradually increasing and then gradually decreasing.

The UAV control method provided in the present disclosure can control the antenna device of the UAV to transmit microwave transmission signals and obtain received signals. Further, an intermediate frequency signal mixed by the frequency of the microwave transmission signal and the received signal can be obtained, and whether the received signal is a burst interference signal in the time period corresponding to the frequency fluctuation (the intermediate frequency single of the received signal may be a fixed frequency in different periods of time, or may be a fluctuating frequency) can be determined. The burst interference signal may be a signal whose frequency gradually decreases and then gradually increases, and the signal amplitude gradually increase and then decreases. When the received signal is a burst interference signal in the time period corresponding to the frequency fluctuation, the received signal can be determined as an interference signal of the microwave transmission signal. By using the technical solution of the present disclosure, the part of the interference signal whose frequency is lower than the maximum receiving frequency f_max of the radar receiver filter can be identified.

In some embodiments, the process at 904 of determining whether the received signal is an interference signal based on the change information of the signal frequency and the signal amplitude of the intermediate frequency signal may include obtaining the signal amplitude information of N sampling points of the intermediate frequency signal; selecting P extreme value points based on the signal amplitude information of N sampling points, where P is a positive integer greater than or equal to two and less than N; and determining whether the received signal is an interference signal based on the index values of the P extreme points.

In some embodiments, the method may further include eliminating the interference signal after determining that the received signal is an interference signal.

In some embodiments, selecting P extreme value points based on the signal amplitude information of N sampling points may include, based on the amplitude information of N sampling points of the intermediate frequency signal, determining a maximum amplitude point and a minimum amplitude point in the N sampling points, calculating the amplitude difference between the maximum amplitude point and the minimum amplitude point, and recording the amplitude difference as a first difference; obtaining P extreme value points whose amplitude difference with the adjacent extreme value point is greater than A/2 from the N sampling points; and recording the index value of each extreme point in P extreme value points, and obtaining the P index values, where P is a positive integer greater than or equal to two and less than N.

In some embodiments, determining whether the received signal is an interference signal based on the index values of the P extreme points may include determining whether there are at least two target index values satisfying a predetermined time domain characteristic conditions in the P index values; and determining that the received signal is a burst interference signal in a time period corresponding to a fluctuation frequency after determining there are at least two target index values satisfying the predetermined time domain characteristic conditions in the P index values.

In some embodiments, obtaining P extreme value points whose amplitude difference with the adjacent extreme value point is greater than A/2 from the N sampling points may include obtaining all extreme points in the N sampling points, calculating the amplitude difference between every two adjacent extreme points, and recording the amplitude of the extreme point whose amplitude difference is greater than a predetermined difference and the index value of the extreme point whose amplitude difference is greater than the predetermined difference as a first set; calculating the absolute value of the amplitude difference of every two adjacent extreme points in the first set and the index value difference of every two adjacent extreme points in the first set, and recording the absolute value of the amplitude difference and the absolute value of the index value as a second set; and obtaining the extreme point where the absolute value of the amplitude difference in the second set is greater than A/2, and obtaining the first P extreme value points in a descending order of the absolute value of the amplitude difference.

In some embodiments, determining whether there are at least two target index values satisfying a predetermined time domain characteristic conditions in the P index values may include combining P index values in pairs, using the smaller index value of the combined two index values as a left boundary index value, and using the larger index value of the combined two index values as a right boundary index value; for each combination, calculating an index value difference between the right boundary index value and the left boundary index value, selecting M1 extreme points forward from the left boundary index value based on the order of the distance between the index value and the left boundary index value from small to large, selecting M2 extreme points backward from the right boundary index value based on the order of the distance between the index value and the right boundary index value from small to large, where M1 and M2 may both be positive integers; determining whether the index value difference between the right boundary index value and the left boundary index value satisfies a first predetermined time domain characteristic condition, and determining whether the M1 extreme value points and the M2 extreme value points satisfy a second predetermined time domain characteristic condition; using the two index values as two target index values when the index value difference between the right boundary index value and the left boundary index value satisfies the first predetermined time domain characteristic condition, and when the M1 extreme characteristic condition. The first predetermined time domain characteristic condition may be that the index value difference between the right boundary index value and the left boundary index value is less than a first predetermined interval value. The second predetermined time domain characteristic condition may include the index value difference of the M1 extreme points being less than a second predetermined interval value, and the index value difference of the M2 extreme points being less than the second predetermined interval value. The absolute mean value of the amplitude difference of the M1 extreme points may be less than half of the maximum absolute value of the amplitude difference in the second set, and the absolute mean value of the amplitude difference of the M2 extreme points may be less than half of the maximum absolute value of the amplitude difference in the second set.

In some embodiments, eliminating the interference signal may include using a middle position of the two target index values as a center index value when the target index value satisfying the predetermined time domain characteristic condition is two; when the target index value satisfying the predetermined time domain characteristic condition is greater than two, in all the combinations satisfying the condition, selecting the combination with the largest absolute value of the amplitude difference corresponding to the extreme point as the target index value combination, and using the middle position of the two target index values corresponding to the target index value combination as the center index value (for example, the middle position of the absolute value of the amplitude difference of the M1 extreme points and the absolute value of the amplitude difference of the M2 extreme points in all combinations corresponding to the largest absolute value may be used as the center index value); extending a predetermined sampling point length divided by 2 sampling points forward and backward respectively with the center index value as the center, and using the extended period of time as the burst interference part; and setting the amplitude of all sampling points in the burst interference part to an average value of the amplitudes of the N sampling points.

In some embodiments, the index value, target index value, left boundary index value, right boundary index value, and center index value may all be points in time, and the index value difference may be a difference between points in time.

When there is no fixed delay relationship between the two microwave radars transmission signals, some interference signals with a frequency lower than the maximum effective receiving frequency of the intermediate frequency filter may enter the system. Since the frequency of this part of the interference signal is within the effective signal bandwidth of the microwave radar, it cannot be filtered out from the frequency domain. Therefore, the present disclosure proposes to perform a feature extraction on the signal in the time domain to identify the interference signal part and perform interference cancellation compensation. As shown in FIG. 8, when the modulation waveform between two microwave radars has the above relationship, an intermediate frequency interference signal with a frequency less than f1 may be generated. f1 may be less than the maximum receiving frequency f_max of the intermediate frequency filter of the radar receiver, such that the intermediate frequency filter cannot filter out the interference signal.

The schematic diagram of the time domain signal corresponding to the interference signal of a segment AB in FIG. 8 is shown in FIG. 9. The area within the dashed lines in FIG. 9 is the interference signal part of the segment AB in FIG. 8. Because its shape is similar to a burst signal, it is referred to as a burst interference signal. By observing this signal, it is found that the signal frequency of the signal gradually decreases and then gradually increases, while the signal amplitude gradually increases then gradually decreases, which is the characteristic of the burst signal.

A method for identifying and eliminating the burst interference signal in the present disclosure will be described below. In the present disclosure, it is assumed that a group of radar intermediate frequency signals contains N sampling points. As shown in FIG. 10, the burst interference part is divided into a middle segment, a left extreme value segment, and a right extreme value segment, and feature extraction is performed respectively. Only when the three characteristics are satisfied at the same can an interference be considered as a burst interference. The specific implementation process of this method is shown in FIG. 11, which will be described in detail below.

1, searching for a maximum value and a minimum value of N sampling points, and recording their amplitude difference as amplitude Ampt_max; and calculating a mean value of the amplitude of N sampling points and recording it as Ampt_mean.

2, searching all extreme points in N sampling points, and recording the amplitude of these extreme points and their positions in the N sampling points (that is, the index value).

3, identifying all extreme points whose difference between two adjacent extreme points is greater than Ampt_extre from the extreme points obtained in the process at 2, recording the amplitude of these extreme points and their index values, and recording them as a set S_extre. Ampt_extre represents a reference extreme value difference. The Ampt_extre can be set and adjusted based on the specific situation, the main purpose is to filter out some extreme points with very small change.

4, obtaining an absolute value of the amplitude difference of all adjacent extreme points in the set S_extre and an absolute value of the index difference of the index value of all adjacent extreme points, and recording them as a set S_extre_delta.

5, identifying all extreme points whose absolute value of the amplitude difference between adjacent extreme points in the set S_extre_delta may be greater than Ampt_max/2, extracting four extreme points with the largest absolute value of the amplitude difference (where there are less than four, an actual number shall prevail), and recording the index values of the four extreme points as a set S_extre_index.

6, combining the index values in S_extre_index in pairs, and performing the processes at 7 to 9 respectively.

7, selecting two index values from S_extra_index and using the smaller value as the left boundary of the middle segment, and the larger value as the right boundary, and calculating their difference to see if the difference is less than C_index_mid, where C_index_mid represents the index spacing value of a predetermined middle segment, and this value can be set based on the specific situation.

8, from the left boundary of the middle segment to the left (forward in time), selecting the amplitude difference of M extreme points closest to the left boundary of the middle segment from S_extra_delta, and determining whether these extreme values satisfy the following characteristic conditions.

(1) Determine whether the index difference of these extreme points is less than C_index_edge, where C_index_edge represents the index spacing value of a predetermined left (2) Calculate a mean_edge of the absolute value of the amplitude difference of the M extreme points, extract the maximum value extre_delta_max of the absolute vale of the amplitude difference of the extreme points in S_extra_delta, and determine whether the mean_edge is less than extra_delta_max/2.

9, using the method at 8 to calculate whether the right extreme value small segment satisfies the characteristic conditions.

10, the two index values satisfying the characteristic conditions in the processes at 7 to 9 at the same time may be the target index values to be identified. When more than one set of target index values satisfy the conditions, the ground with the largest value of the extreme point amplitude difference may be selected as the target index value to be identified.

11, using the middle position of a set of target index values obtained in the process at 10 as the center position of the burst interference.

12, extending the center position of the burst interference obtained in the process at 11 to the left and right by band/2 sampling points as the burst interference segment, the band representing the sampling point length of the predetermined burst interference segment.

13, modifying all the sample values of the points in the burst interference segment to Ampt_mean, which means that the burst interference elimination of N sampling points is completed After eliminating the interference signal using the microwave radar anti-burst interference method, the position of an obstacle may be determined based on the echo signal of the microwave transmission signal after the interference signal is eliminated, and the flight state or the flight trajectory of the UAV may be controlled based on the position of the obstacle, such as controlling the UAV to stop flying at the position of the obstacle (e.g., hovering at a certain height position) or fly around the obstacle.

A tenth aspect of the present disclosure provides a computer storage medium. The computer storage medium stores program instructions, and the program instructions can be used to control the antenna device of the microwave radar to transmit microwave signals and/or obtain received signals; obtain an intermediate frequency signal mixed by the frequency of the microwave transmission signal and the received signal; determine the change information of the signal frequency and signal amplitude of the intermediate frequency signal; and determine whether the received signal is an interference signal based on the change information of the signal frequency and signal amplitude of the intermediate frequency signal.

In some embodiments, the program instructions determining whether the received signal is an interference signal based on the change information of the signal frequency and the signal amplitude of the intermediate frequency signal may include determining the received signal is an interference signal if the change state of the signal frequency of the received signal is gradually decreasing and then gradually increasing, and the change state of the signal amplitude is gradually increasing and then gradually decreasing.

The program instructions in the computer storage medium provided in the present disclosure can be used to control the antenna device of the microwave radar to transmit microwave transmission signals and obtain received signals. Further, an intermediate frequency signal mixed by the frequency of the microwave transmission signal and the received signal can be obtained, and whether the received signal is an interference can be determined by determining whether the change state of the frequency of the signal transmitted by the microwave is gradually decreasing and then gradually increasing, and whether the change state of the signal amplitude is gradually increasing and then gradually decreasing. If so, the received signal can be determined as the interference signal of the microwave transmission signal. By using the technical solution of the present disclosure, the part of the interference signal whose frequency is lower than the maximum receiving frequency f_max of the radar receiver filter can be identified.

In some embodiments, the computer storage medium may include a volatile storage device or a non-volatile storage device. The computer storage medium may also be a serial storage device or a parallel storage device. The computer storage medium may also be a RAM storage device or a ROM storage device In some embodiments, the program instructions determining whether the received signal is an interference signal based on the change information of the signal frequency and the signal amplitude of the intermediate frequency signal may include obtaining the signal amplitude information of N sampling points of the intermediate frequency signal; selecting P extreme value points based on the signal amplitude information of N sampling points, where P is a positive integer greater than or equal to two and less than N; and determining whether the received signal is an interference signal based on the index values of the P extreme points.

In some embodiments, the program instructions may further be used to eliminate the interference signal after determining that the received signal is an interference signal.

In some embodiments, the program instructions selecting P extreme value points based on the signal amplitude information of N sampling points may include, based on the amplitude information of N sampling points of the intermediate frequency signal, determining a maximum amplitude point and a minimum amplitude point in the N sampling points, calculating the amplitude difference between the maximum amplitude point and the minimum amplitude point, and recording the amplitude difference as a first difference; obtaining P extreme value points whose amplitude difference with the adjacent extreme value point is greater than A/2 from the N sampling points; and recording the index value of each extreme point in P extreme value points, and obtaining the P index values, where P is a positive integer greater than or equal to two and less than N.

In some embodiments, the program instructions determining whether the received signal is an interference signal based on the index values of the P extreme points may include determining whether there are at least two target index values satisfying a predetermined time domain characteristic conditions in the P index values; and determining that the received signal is a burst interference signal in a time period corresponding to a fluctuation frequency after determining there are at least two target index values satisfying the predetermined time domain characteristic conditions in the P index values.

In some embodiments, the program instructions obtaining P extreme value points whose amplitude difference with the adjacent extreme value point is greater than A/2 from the N sampling points may include obtaining all extreme points in the N sampling points, calculating the amplitude difference between every two adjacent extreme points, and recording the amplitude of the extreme point whose amplitude difference is greater than a predetermined difference and the index value of the extreme point whose amplitude difference is greater than the predetermined difference as a first set; calculating the absolute value of the amplitude difference of every two adjacent extreme points in the first set and the index value difference of every two adjacent extreme points in the first set, and recording the absolute value of the amplitude difference and the absolute value of the index value as a second set; and obtaining the extreme point where the absolute value of the amplitude difference in the second set is greater than A/2, and obtaining the first P extreme value points in a descending order of the absolute value of the amplitude difference.

In some embodiments, the program instructions determining whether there are at least two target index values satisfying a predetermined time domain characteristic conditions in the P index values may include combining P index values in pairs, using the smaller index value of the combined two index values as a left boundary index value, and using the larger index value of the combined two index values as a right boundary index value; for each combination, calculating an index value difference between the right boundary index value and the left boundary index value, selecting M1 extreme points forward from the left boundary index value based on the order of the distance between the index value and the left boundary index value from small to large, selecting M2 extreme points backward from the right boundary index value based on the order of the distance between the index value and the right boundary index value from small to large, where M1 and M2 may both be positive integers; determining whether the index value difference between the right boundary index value and the left boundary index value satisfies a first predetermined time domain characteristic condition, and determining whether the M1 extreme value points and the M2 extreme value points satisfy a second predetermined time domain characteristic condition; using the two index values as two target index values when the index value difference between the right boundary index value and the left boundary index value satisfies the first predetermined time domain characteristic condition, and when the M1 extreme value points and the M2 extreme value points satisfy the second predetermined time domain characteristic condition. The first predetermined time domain characteristic condition may be that the index value difference between the right boundary index value and the left boundary index value is less than a first predetermined interval value. The second predetermined time domain characteristic condition may include the index value difference of the M1 extreme points being less than a second predetermined interval value, and the index value difference of the M2 extreme points being less than the second predetermined interval value. The absolute mean value of the amplitude difference of the M1 extreme points may be less than half of the maximum absolute value of the amplitude difference in the second set, and the absolute mean value of the amplitude difference of the M2 extreme points may be less than half of the maximum absolute value of the amplitude difference in the second set.

In some embodiments, the program instructions eliminating the interference signal may include using a middle position of the two target index values as a center index value when the target index value satisfying the predetermined time domain characteristic condition is two; when the target index value satisfying the predetermined time domain characteristic condition is greater than two, in all the combinations satisfying the condition, selecting the combination with the largest absolute value of the amplitude difference corresponding to the extreme point as the target index value combination, and using the middle position of the two target index values corresponding to the target index value combination as the center index value (for example, the middle position of the absolute value of the amplitude difference of the M1 extreme points and the absolute value of the amplitude difference of the M2 extreme points in all combinations corresponding to the largest absolute value may be used as the center index value); extending a predetermined sampling point length divided by 2 sampling points forward and backward respectively with the center index value as the center, and using the extended period of time as the burst interference part; and setting the amplitude of all sampling points in the burst interference part to an average value of the amplitudes of the N sampling points.

In some embodiments, the index value, target index value, left boundary index value, right boundary index value, and center index value may all be points in time, and the index value difference may be a difference between points in time.

The program instructions in the computer storage medium provided in the present disclosure can realize the control of the antenna device to transmit the microwave transmission signals and obtain received signal, and realize the anti-burst interference method of the microwave radar including obtaining an intermediate frequency signal mixed by the frequency of the microwave transmission signal and the received signal, determining whether the received signal is a burst interference signal in the time period corresponding to the frequency fluctuation. The burst interference signal may be a signal whose frequency gradually decreases and then gradually increases, and the signal amplitude gradually increase and then decreases. When the received signal is a burst interference signal in the time period corresponding to the frequency fluctuation, the received signal can be determined as an interference signal of the microwave transmission signal. The specific determination method may include obtaining N sampling points included in the intermediate frequency signal, and performing time-domain feature extraction on the N sampling points; and determining whether the received signal can be divided into three segment, the middle segment, the left extreme value segment, and the right extreme value segment within the time period corresponding to the frequency fluctuation (the frequency fluctuation may be different in each segment). Only when the three segment characteristics are satisfied at the same can an interference be considered as a burst interference signal. After determining that the received signal is an interference signal, the interference signal can be eliminated by setting the signal amplitude. By using the anti-burst interference method of the microwave radar, the part of the interference signal whose frequency is lower than the maximum receiving frequency f_max of the radar receiver filter can be identified and filtered.

When there is no fixed delay relationship between the two microwave radars transmission signals, some interference signals with a frequency lower than the maximum effective receiving frequency of the intermediate frequency filter may enter the system. Since the frequency of this part of the interference signal is within the effective signal bandwidth of the microwave radar, it cannot be filtered out from the frequency domain. Therefore, the present disclosure proposes to perform a feature extraction on the signal in the time domain to identify the interference signal part and perform interference cancellation compensation. As shown in FIG. 8, when the modulation waveform between two microwave radars has the above relationship, an intermediate frequency interference signal with a frequency less than f1 may be generated. f1 may be less than the maximum receiving frequency f_max of the intermediate frequency filter of the radar receiver, such that the intermediate frequency filter cannot filter out the interference signal.

The schematic diagram of the time domain signal corresponding to the interference signal of a segment AB in FIG. 8 is shown in FIG. 9. The area within the dashed lines in FIG. 9 is the interference signal part of the segment AB in FIG. 8. Because its shape is similar to a burst signal, it is referred to as a burst interference signal. By observing this signal, it is found that the signal frequency of the signal gradually decreases and then gradually increases, while the signal amplitude gradually increases then gradually decreases, which is the characteristic of the burst signal.

A method for identifying and eliminating the burst interference signal in the present disclosure will be described below. In the present disclosure, it is assumed that a group of radar intermediate frequency signals contains N sampling points. As shown in FIG. 10, the burst interference part is divided into a middle segment, a left extreme value segment, and a right extreme value segment, and feature extraction is performed respectively. Only when the three characteristics are satisfied at the same can an interference be considered as a burst interference. The specific implementation process of this method is shown in FIG. 11, which will be described in detail below.

1, searching for a maximum value and a minimum value of N sampling points, and recording their amplitude difference as amplitude Ampt_max; and calculating a mean value of the amplitude of N sampling points and recording it as Ampt_mean.

2, searching all extreme points in N sampling points, and recording the amplitude of these extreme points and their positions in the N sampling points (that is, the index value).

3, identifying all extreme points whose difference between two adjacent extreme points is greater than Ampt_extre from the extreme points obtained in the process at 2, recording the amplitude of these extreme points and their index values, and recording them as a set S_extre. Ampt_extre represents a reference extreme value difference. The Ampt_extre can be set and adjusted based on the specific situation, the main purpose is to filter out some extreme points with very small change.

4, obtaining an absolute value of the amplitude difference of all adjacent extreme points in the set S_extre and an absolute value of the index difference of the index value of all adjacent extreme points, and recording them as a set S_extre_delta.

5, identifying all extreme points whose absolute value of the amplitude difference between adjacent extreme points in the set S_extre_delta may be greater than Ampt_max/2, extracting four extreme points with the largest absolute value of the amplitude difference (where there are less than four, an actual number shall prevail), and recording the index values of the four extreme points as a set S_extre_index.

6, combining the index values in S_extre_index in pairs, and performing the processes at 7 to 9 respectively.

7, selecting two index values from S_extra_index and using the smaller value as the left boundary of the middle segment, and the larger value as the right boundary, and calculating their difference to see if the difference is less than C_index_mid, where C_index_mid represents the index spacing value of a predetermined middle segment, and this value can be set based on the specific situation.

8, from the left boundary of the middle segment to the left (forward in time), selecting the amplitude difference of M extreme points closest to the left boundary of the middle segment from S_extra_delta, and determining whether these extreme values satisfy the following characteristic conditions.

(1) Determine whether the index difference of these extreme points is less than C_index_edge, where C_index_edge represents the index spacing value of a predetermined left (or right) extreme small segment.

(2) Calculate a mean_edge of the absolute value of the amplitude difference of the M extreme points, extract the maximum value extre_delta_max of the absolute vale of the amplitude difference of the extreme points in S_extra_delta, and determine whether the mean_edge is less than extra_delta_max/2.

9, using the method at 8 to calculate whether the right extreme value small segment satisfies the characteristic conditions.

10, the two index values satisfying the characteristic conditions in the processes at 7 to 9 at the same time may be the target index values to be identified. When more than one set of target index values satisfy the conditions, the ground with the largest value of the extreme point amplitude difference may be selected as the target index value to be identified.

11, using the middle position of a set of target index values obtained in the process at 10 as the center position of the burst interference.

12, extending the center position of the burst interference obtained in the process at 11 to the left and right by band/2 sampling points as the burst interference segment, the band representing the sampling point length of the predetermined burst interference segment.

13, modifying all the sample values of the points in the burst interference segment to Ampt_mean, which means that the burst interference elimination of N sampling points is completed.

In the description of the present disclosure, the terms "first" and "second" are used for descriptive purposes only, which cannot be construed as indicating or implying a relative importance, or implicitly specifying the number of the indicated technical features. Thus, the features defined with "first" and "second" may explicitly or implicitly include one or more features. In the description of the present disclosure, "a plurality of" means two or more than two, unless specifically stated otherwise.

In the description of the present disclosure, unless specifically stated and limited, the terms "mounting," "joining," "connection" should be understood in a broad sense, such as, a fixed connection, a detachable connection, or an integral connection; a mechanical connection, an electrical connection, or a communicative connection; a direct connection, an indirect connection through an intermediate medium, an internal connection of two elements, or an interaction of two elements. For those ordinary skilled in the art, the specific meanings of the foregoing terms in the present disclosure can be understood on a case-by-case basis.

In the present description, descriptions of reference terms such as "an embodiment," "some embodiments," "illustrative embodiment," "example," "specific example," or "some examples," mean that characteristics, structures, materials, or features described in relation to the embodiment or example are included in at least one embodiment or example of the present disclosure. In the present description, illustrative expression of the above terms does not necessarily mean the same embodiment or example. Further, specific characteristics, structures, materials, or features may be combined in one or multiple embodiments or examples in a suitable manner.

The above descriptions merely illustrate some embodiments of the present disclosure. The present disclosure is not limited the described embodiments. A person having ordinary skill in the art may conceive various equivalent modifications or replacements based on the disclosed technology. Such modification or improvement also fall within the scope of the present disclosure. A true scope and spirit of the present disclosure are indicated by the following claims.

What is claimed is:

1. A UAV control method comprising:
controlling an antenna device of a microwave radar of the UAV to transmit a microwave transmission signal and obtain a received signal, the microwave transmission signal and the received signal both being trapezoidal modulation waveforms, and one cycle of the trapezoidal modulation waveform including a frequency rising part, a frequency falling part, and a fixed frequency part;
obtaining an intermediate frequency signal mixed by a frequency of the microwave transmission signal and the received signal to the radar controller, and determining whether the received signal is an interference signal based on the intermediate frequency signal, including:
determining a first intermediate frequency corresponding to the frequency rising part of the received signal and a second intermediate frequency signal corresponding to the frequency falling part of the received signal based on the intermediate frequency; and
determining whether the received signal is the interference signal based on a frequency difference between the first intermediate frequency and the second intermediate frequency;

determining coordinate information of a detection target corresponding to the received signal if the received signal is not the interference signal; and updating a trajectory of the UAV based on the coordinate information of the detection target.

2. The UAV control method of claim 1, wherein determining whether the received signal is the interference signal based on the frequency difference between the first intermediate frequency and the second intermediate frequency includes:

calculating the frequency difference between the first intermediate frequency and the second intermediate frequency; and determining whether the received signal is the interference signal based on a magnitude relationship between the frequency difference and a predetermined threshold.

3. The UAV control method of claim 2, wherein determining whether the received signal is the interference signal based on the magnitude relationship between the frequency difference and the predetermined threshold includes:

determining the received signal is the interference signal when the frequency difference is greater than or equal to the predetermined threshold; and determining the received signal is an echo signal of the microwave transmission signal when the frequency difference is less than the predetermined threshold.

4. A microwave radar comprising:

an antenna device; and a radar controller in communication with the antenna device, the radar controller being configured to:

control the antenna device to transmit a microwave transmission signal and obtain a received signal, the microwave transmission signal and the received signal both being trapezoidal modulation waveforms, and one cycle of the trapezoidal modulation waveform including a frequency rising part, a frequency falling part, and a fixed frequency part;

obtain an intermediate frequency signal mixed by a frequency of the microwave transmission signal and the received signal to the radar controller, and determine whether the received signal is an interference signal based on the intermediate frequency signal, including:

determining a first intermediate frequency corresponding to the frequency rising part of the received signal and a second intermediate frequency signal corresponding to the frequency falling part of the received signal based on the intermediate frequency; and determining whether the received signal is the interference signal based on a frequency difference between the first intermediate frequency and the second intermediate frequency.

5. The microwave radar of claim 4, wherein the radar controller is further configured to:

calculate the frequency difference between the first intermediate frequency and the second intermediate frequency; and determine whether the received signal is the interference signal based on a magnitude relationship between the frequency difference and a predetermined threshold.

6. The microwave radar of claim 5, wherein the radar controller is further configured to:

determine the received signal is the interference signal when the frequency difference is greater than or equal to the predetermined threshold; and determine the received signal is an echo signal of the microwave transmission signal when the frequency difference is less than the predetermined threshold.

7. A mobile platform comprising:

a microwave radar including:

an antenna device; and a radar controller in communication with the antenna device, the radar controller being configured to:

control the antenna device to transmit a microwave transmission signal and obtain a received signal, the microwave transmission signal and the received signal both being trapezoidal modulation waveforms, and one cycle of the trapezoidal modulation waveform including a frequency rising part, a frequency falling part, and a fixed frequency part;

obtain an intermediate frequency signal mixed by a frequency of the microwave transmission signal and the received signal to the radar controller, and determine whether the received signal is an interference signal based on the intermediate frequency signal, including:

determining a first intermediate frequency corresponding to the frequency rising part of the received signal and a second intermediate frequency signal corresponding to the frequency falling part of the received signal based on the intermediate frequency; and determining whether the received signal is the interference signal based on a frequency difference between the first intermediate frequency and the second intermediate frequency; and a controller in communication with the microwave radar, the controller being configured to:

determine coordinate information of a detection target corresponding to the received signal if the received signal is not the interference signal; and update a trajectory of the mobile platform based on the coordinate information of the detection target.

8. The mobile platform of claim 7, wherein the radar controller is further configured to:

calculate the frequency difference between the first intermediate frequency and the second intermediate frequency; and determine whether the received signal is the interference signal based on a magnitude relationship between the frequency difference and a predetermined threshold.

9. The mobile platform of claim 8, wherein the radar controller is further configured to:

determine the received signal is the interference signal when the frequency difference is greater than or equal to the predetermined threshold; and determine the received signal is an echo signal of the microwave transmission signal when the frequency difference is less than the predetermined threshold.

* * * * *